United States Patent
Koyama et al.

(10) Patent No.: US 7,130,394 B2
(45) Date of Patent: Oct. 31, 2006

(54) IMAGING APPARATUS WITH COMMUNICATION FUNCTION, IMAGE DATA STORING METHOD AND COMPUTER PROGRAM

(75) Inventors: Hirohisa Koyama, Tachikawa (JP); Shoichi Nagatomo, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 210 days.

(21) Appl. No.: 10/826,061

(22) Filed: Apr. 15, 2004

(65) Prior Publication Data

US 2004/0207722 A1    Oct. 21, 2004

(30) Foreign Application Priority Data

Apr. 18, 2003 (JP) ............................. 2003-113605
Mar. 5, 2004 (JP) ............................. 2004-062332

(51) Int. Cl.
*H04M 11/00* (2006.01)
(52) U.S. Cl. ..................... 379/93.23; 348/14.02
(58) Field of Classification Search .. 348/14.01–14.16, 348/354, 355.02, 355.05; 455/556.1, 556.2, 455/566; 379/93.23, 93.17, 93.19
See application file for complete search history.

(56) References Cited

U.S. PATENT DOCUMENTS

| | | | |
|---|---|---|---|
| 5,907,604 A | 5/1999 | Hsu | |
| 6,466,202 B1 | 10/2002 | Maruyama et al. | |
| 2002/0049071 A1 | 4/2002 | Bjorn | |
| 2002/0094806 A1 | 7/2002 | Kamimura | |

FOREIGN PATENT DOCUMENTS

| | | |
|---|---|---|
| EP | 436345 A2 * | 7/1991 |
| EP | 0 930 770 A | 7/1999 |
| EP | 1 033 857 A | 9/2000 |
| EP | 1067748 A2 * | 1/2001 |
| JP | 11-041339 A | 2/1999 |
| JP | 2001-024776 A | 1/2001 |
| JP | 2001-274979 A | 10/2001 |

OTHER PUBLICATIONS

K. Krollman et al: "Display End User on Cellular Telephone (Radio)", Motorola Technical Developments, Motorola, Inc., Schaumburg, Illinois, U.S.A.; vol. 38, Jun. 1999, p. 241, XP000906111, ISSN: 0887-5286—entire document.

* cited by examiner

*Primary Examiner*—Stella Woo
(74) *Attorney, Agent, or Firm*—Frishauf, Holtz, Goodman & Chick, P.C.

(57) ABSTRACT

A CPU detects an instruction to activate an address book mode by detecting an operation of an address book key in an incoming call waiting state, and displays an address book data new creation screen or an existing data edition screen in a main display panel by activating an address book viewing/creation/edition program by using an ROM. When "activation of camera" is selected, an imaging unit is activated, display of a corresponding resolution is set in a monitor display area, and images are sequentially displayed. When a picked-up image is determined by detecting an operation of a determination key, image data of the displayed image is stored in an image memory, a link "1" for image display is set in a corresponding address data area in an address book data storage area, and a record number 001 in the image memory storing the image data is stored in a link information storage area in association with 001 in the address book data storage area.

14 Claims, 29 Drawing Sheets

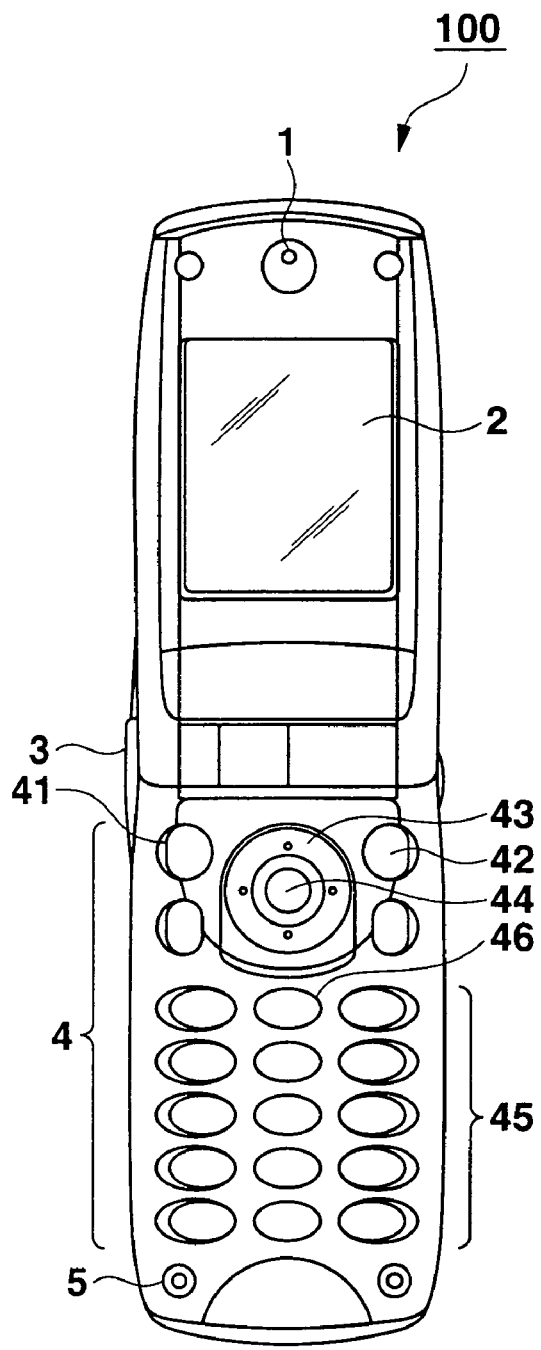
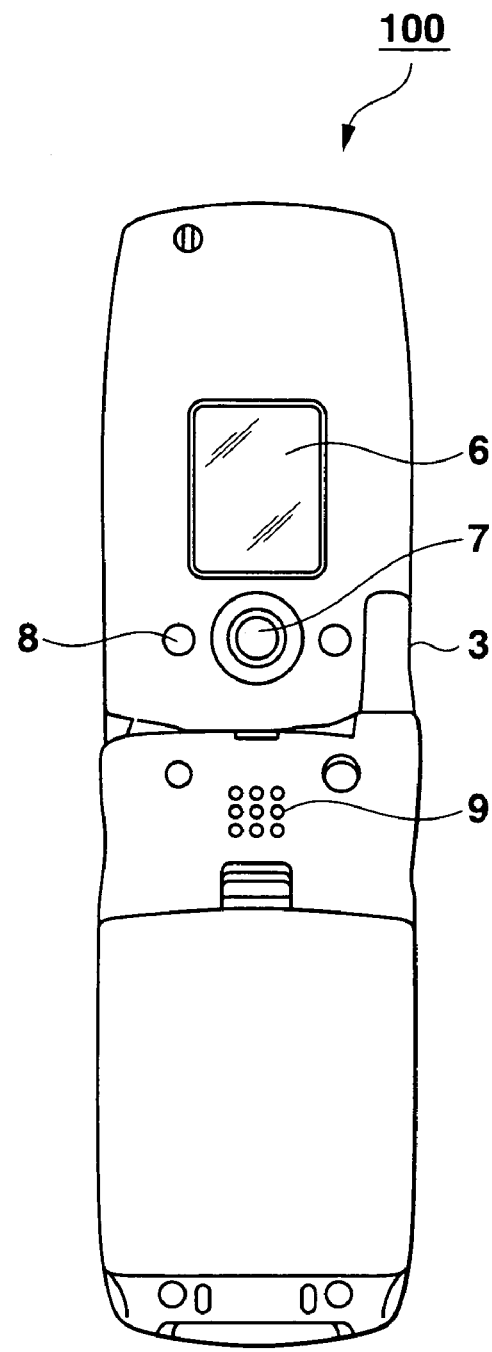
FIG.1A  FIG.1B

19

| RECORD NO. | FILE NAME | FOLDER ATTRIBUTE | | | FLAG |
|---|---|---|---|---|---|
| 001 | Still1104 | | | | 1 |
| 002 | Still0103 | | | | |
| ≈ | ≈ | ≈ | ≈ | ≈ | ≈ |
| 015 | | | | | |

| RECORD NO. | CONTACT INFORMATION | | | ... | PRESENCE/ ABSENCE OF LINK |
|---|---|---|---|---|---|
| | NAME | TELEPHONE NO. | E-MAIL ADDRESS | | |
| 003 | YOKO AKIMOTO | 09012345678 | akimoto@xxx.com | | ....... |
| 002 | AKIKO SUZUKI | 08020005678 | akiko@xxx.com | | ....... |
| 001 | REI TANAKA | 09010001111 | rei@xxx.com | | 1 |
| ≈ | ≈ | ≈ | ≈ | ≈ | ≈ |
| | | | | | |

| RECORD NO. IN ADDRESS BOOK DATA STORAGE AREA 172 | RECORD NO. IN IMAGE MEMORY 10 |
|---|---|
| 001 | 001 |
| | |

FIG.8

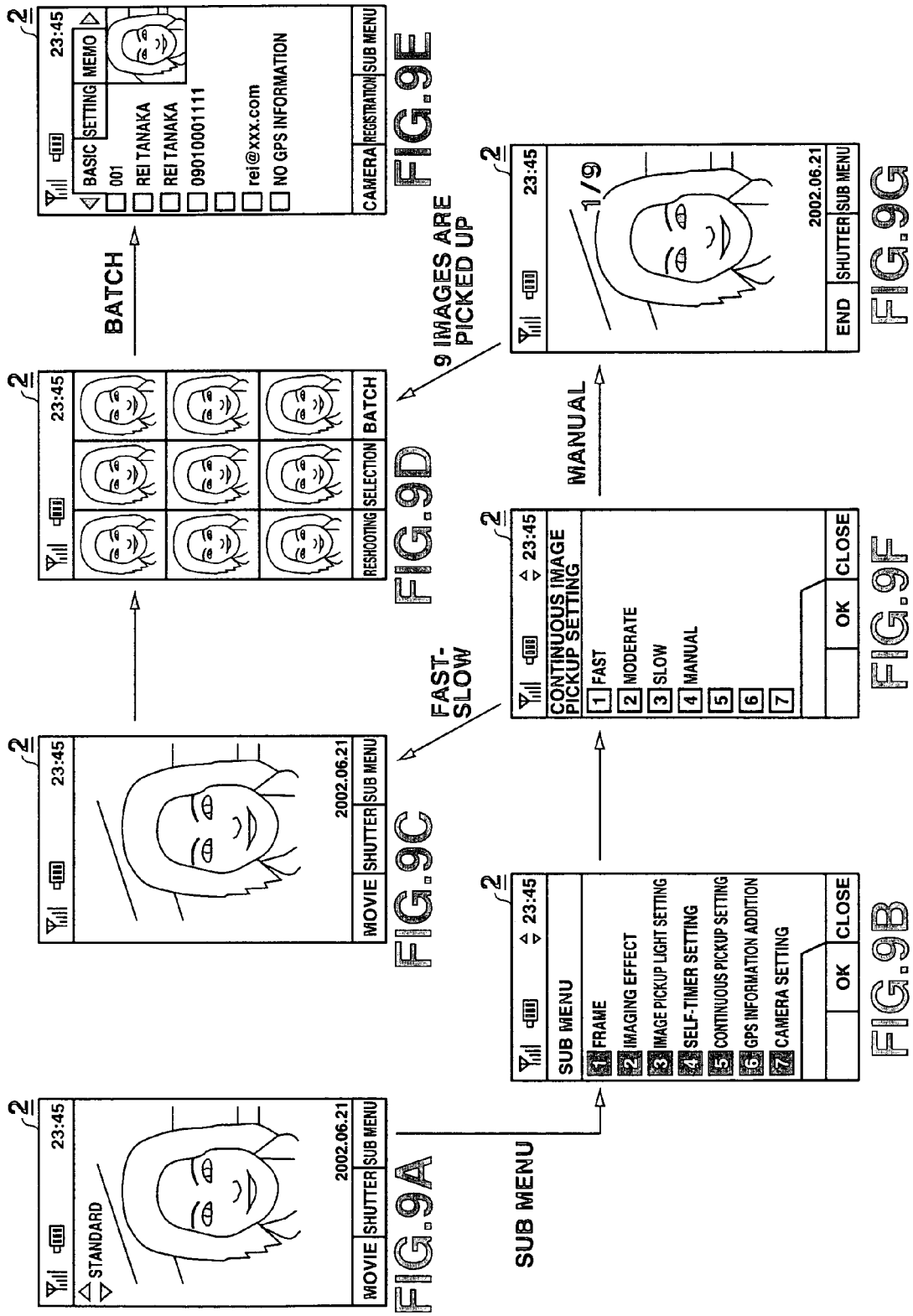

DATA FOLDER

ORIGINAL IMAGE

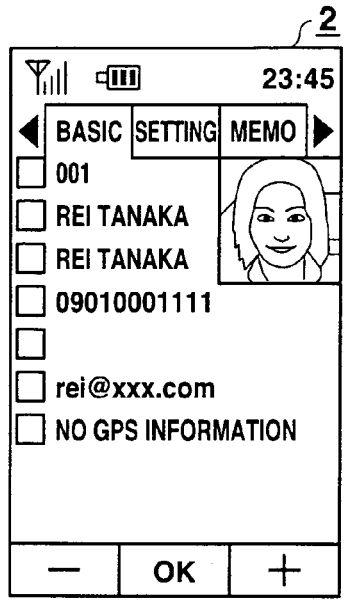 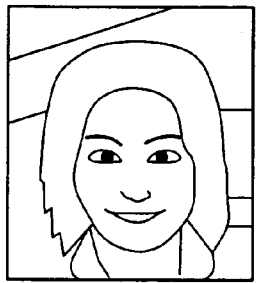 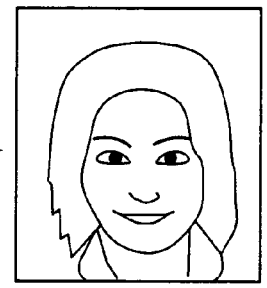
FIG.20A  FIG.20B  FIG.20C
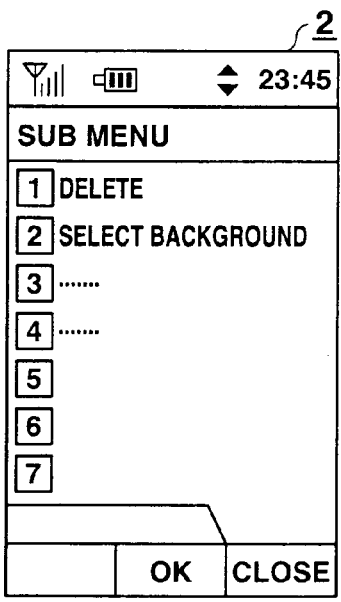 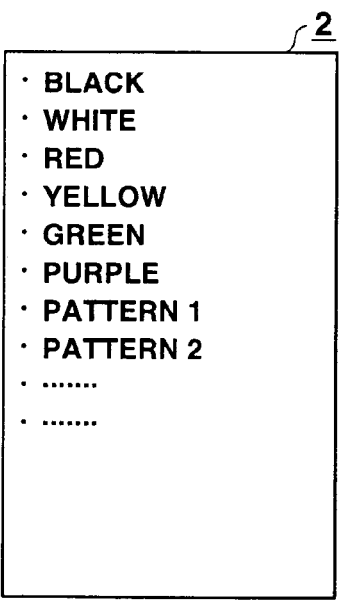 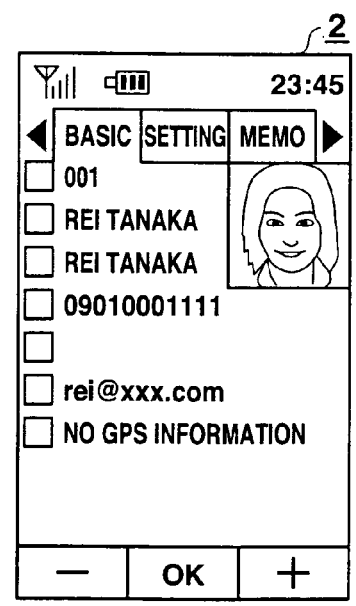
FIG.20D  FIG.20E  FIG.20F

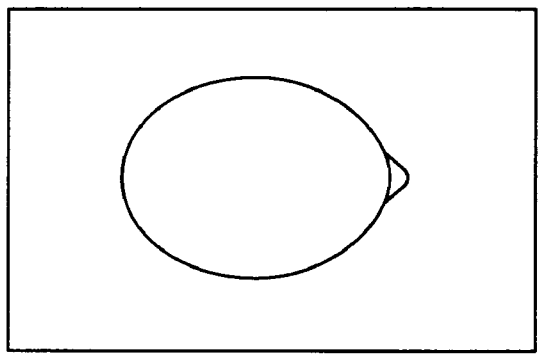
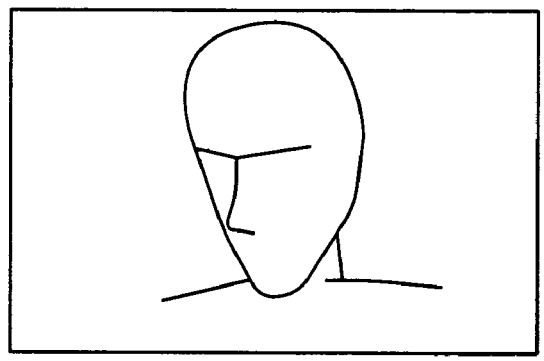
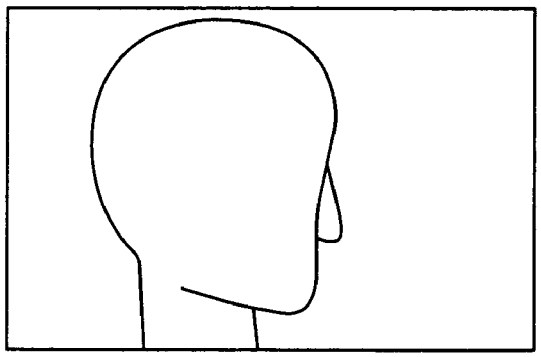
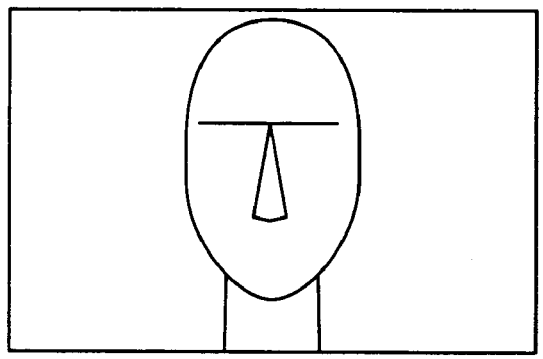
FIG.21

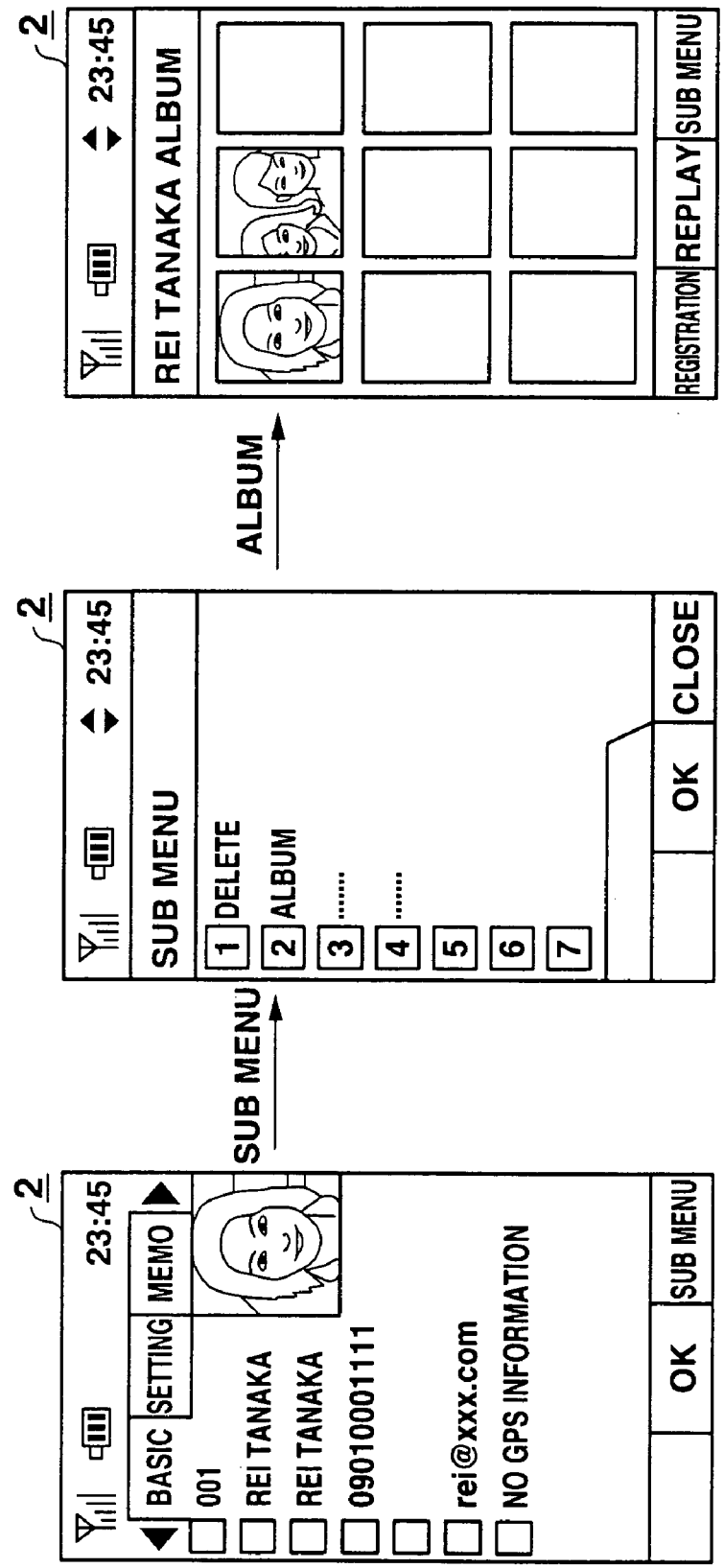

| CAMERA (PHOTOGRAPHY) ITEM | ACTIVATION OF CAMERA DURING ADDRESS BOOK EDITING (DIFFERENCE FROM ACTIVATION OF CAMERA FROM WAITING STATE) | | |
|---|---|---|---|
| FRAME | ○ | | |
| IMAGE PICKUP EFFECT | ○ | | |
| MACRO SETTING | ○ | | |
| IMAGE PICKUP LIGHT SETTING | ○ | | |
| SELF-TIMER SETTING | ○ | | |
| WHITE BALANCE | ○ | | |
| IMAGE PICKUP MODE | MOBILE (120×160) ○ | | |
| | WALLPAPER (240×320) ○ | | |
| | VGA (640×480) × | | |
| | SXGA (1280×960) × | | |
| | UXGA (1600×1200) × | | |
| | PANORAMA (1280×320) × | | |
| | COUPLING SHOT (HORIZONTAL DIVISIONAL PHOTOGRAPHY) ○ | | |
| | UP-DOWN SHOT (VERTICAL DIVISIONAL PHOTOGRAPHY) ○ | | |
| | CONTINUOUS IMAGE PICKUP ○ | FULL SAVING AFTER CONTINUOUS IMAGE PICKUP × | |
| IMAGE QUALITY SETTING | × (SINCE IT IS EFFECTIVE IN PHOTOGRAPHY WITH SIZE EQUAL TO OR ABOVE VGA) | | |
| GPS INFORMATION ADDITION | × | | |
| IMAGE PICKUP SETTING | ○ (DATE STAMP, SHUTTER SOUND SELECTION, SELF-TIMER TIME, AUTO-FOCUS SETTING, INFORMATION DISPLAY, EMPTY FOLDER CAPACITY) | | |

FIG.24

| Exif HEADER | |
|---|---|
| IMAGE ADDITION INFORMATION | Exif INFORMATION |
| | THUMBNAIL IMAGE DATA (120×160) |
| DATA | ORIGINAL DATA<br><br>MOBILE (120×160)<br>WALLPAPER (240×320)<br>VGA (640×480)<br>SXGA (1280×960)<br>UXGA (1600×1200)<br>PANORAMA (1280×320) |

FIG.27

IMAGING APPARATUS WITH COMMUNICATION FUNCTION, IMAGE DATA STORING METHOD AND COMPUTER PROGRAM

CROSS-REFERENCE TO RELATED APPLICATIONS

This application is based upon and claims the benefit of priority from prior Japanese Patent Applications No. 2003-113605, filed Apr. 18, 2003; and No. 2004-062332, filed Mar. 5, 2004, the entire contents of both of which are incorporated herein by reference.

BACKGROUND OF THE INVENTION

1. Field of the Invention

The present invention relates to an imaging apparatus with a communication function which has a function to display an image picked up by using, e.g., a still picture pick up function together with contact information such as a telephone number, an image data storing method, and a computer program.

2. Description of the Related Art

Mobile phones have conventionally included a so-called address book function, outgoing call history display function, and incoming call history display function which display a telephone number which is dialed by the phones and a telephone number received through a caller's number display service. The address book function displays a telephone number and information concerning a person to contact specified by this telephone number, e.g., a name stored in association with this telephone number.

On the other hand, in recent years, by providing an image display function to mobile phones, there are mobile phones which display an image such as a corresponding facial portrait when displaying an address book (e.g., Japanese Patent Application KOKAI Publication No. 2001-24776, page 5, FIG. 8).

However, as described above, conventional mobile phones can store picked-up image data in, e.g., an address book, but they are hard to directly activate a camera from a data edition mode, take a picture immediately and return to the edition mode. Further, only one item of picked-up image data can be stored (linked), and hence the usability is poor. Furthermore, the number of items of data which can be stored is only one, and there is the inconvenience that images concerning a given person cannot be gathered up even though they should be gathered up. Moreover, stored data is displayed only when viewing data in, e.g., an address book, and there is no further effective exploitation, e.g., automatically determining an incoming call notifying tone based on an image or picking up a relevant image.

It is an object of the present invention to provide an imaging apparatus with a communication function which associates picked-up image data with an address book in an edition mode, an image data storing method, and a program.

BRIEF SUMMARY OF THE INVENTION

According to an embodiment of the invention, an imaging apparatus with a communication function, comprises:

communicating means;

address book storing means for storing contact data used in communication by the communicating means;

means for instructing a mode used to create contact data to be stored in the address book storing means or edit contact data stored in the address book storing means;

imaging means which is activated by detecting an instruction issued by the instructing means; and image storing means for storing image data picked up by the imaging means in association with contact data as a creation or editing target.

According to another embodiment of the invention, an image data storing method for an electronic device including a communication unit and an imaging unit, the method comprises:

a step of instructing a mode used to create contact data which is utilized for communication or edit contact data stored in address book storing means;

an imaging step of activating the imaging unit by detecting an instruction issued at the instructing step; and a storing step of storing image data picked up at the imaging step in association with the created or edited contact data.

According to still another embodiment of the invention, a computer program which causes a computer including a communication unit, an imaging unit and a display panel to execute:

an instructing step to instruct a mode to create contact data used for communication or edit contact data stored in address book storing means;

an imaging step to activate the imaging unit by detecting an instruction issued at the instructing step;

a storing step to store in a memory image data picked up at the imaging step in association with the created or edited contact data; and a resolution setting step to set a resolution of a display panel with respect to a case that an image based on image data picked up at the imaging step is displayed and a case that an image based on the picked-up image data is displayed in association with the contact data.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1A is an external view of a mobile phone terminal according to a first embodiment of the present invention, which is also a front view showing an opened state;

FIG. 1B is a rear view showing a closed state of the same;

FIG. 4 shows a structural example of an image memory shown in FIG. 2;

FIG. 7 shows a structure of an address book data storage area set in the RAM shown in FIG. 2;

FIG. 8 shows a structure of a link information storage area set in the RAM shown in FIG. 2;

FIGS. 9A, 9B, 9C, 9D, 9E, 9F and 9G are views showing screen examples displayed when collectively associating/storing a plurality of frames of image data with/in address book data in the mobile phone terminal according to the first embodiment;

FIGS. 20A, 20B, 20C, 20D, 20E and 20F are views showing screen examples displayed when processing a background of image data associated/stored with/in address book data in the mobile phone terminal according to the third embodiment;

FIG. 21 is a view showing a stored contents example of an image recognition unit of a mobile phone terminal according to a fourth embodiment of the present invention;

FIGS. 23A, 23B and 23C are views showing screen examples displayed when retrieving the same person as a person included in image data associated/stored with/in address book data of the mobile phone terminal according to the fourth embodiment;

FIG. 24 shows table data showing a difference in selectable pickup size stored in an ROM 16 between a regular camera mode and a camera mode from an address book in a fifth embodiment;

FIG. 27 is a conceptual view showing a structure of an image file complying with the Exif standard which is used as an image file in a sixth embodiment;

DETAILED DESCRIPTION OF THE INVENTION

Embodiments according to the present invention will now be described hereinafter with reference to the accompanying drawings.

1. First Embodiment 1-1. Structure of First Embodiment

Figure 1C:
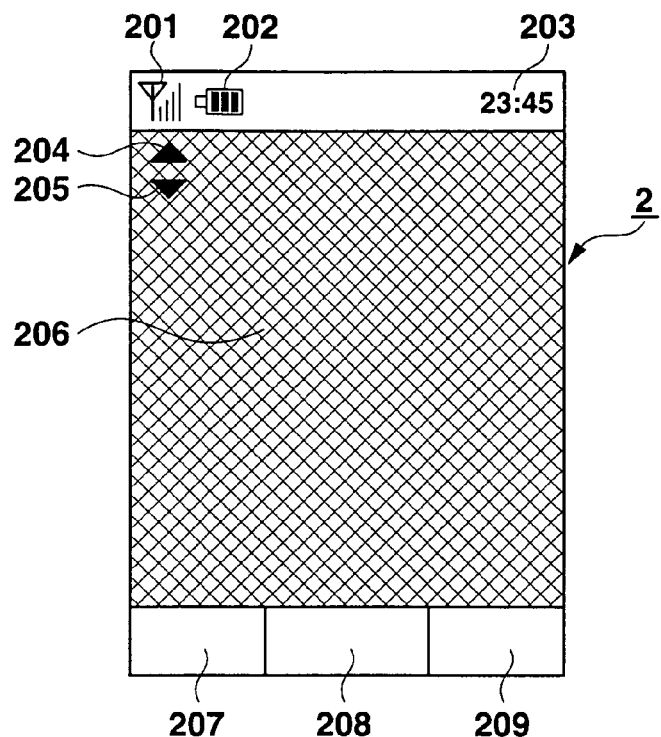
FIG. 1C is a view showing a display layout of a main display panel of the same.
Figure 1D:
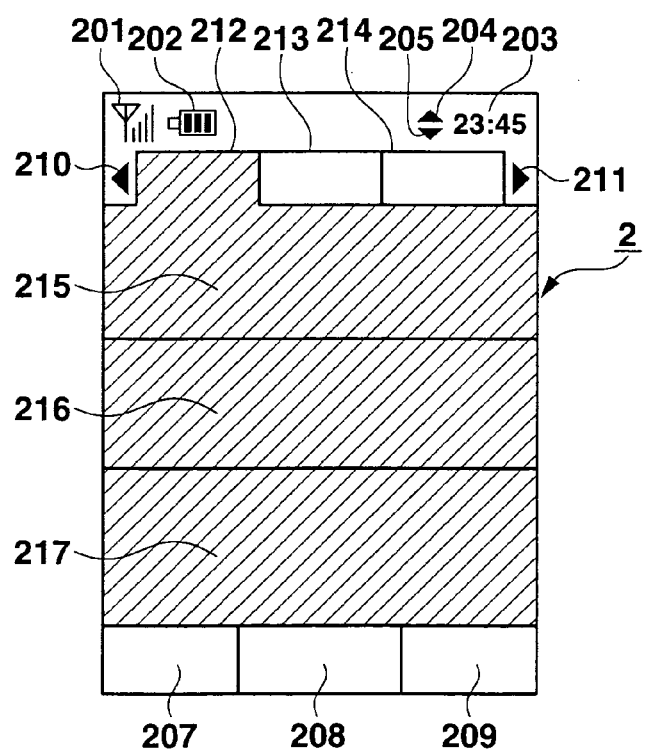
FIG. 1D is a view showing a display layout of the main display panel of the same.

FIGS. 1A and 1B are external views (a front view and a rear view showing an opened state) of a mobile phone terminal 100, and FIGS. 1C and 1D are views showing display layouts of a main display panel. The mobile phone terminal 100 in this embodiment has a folded structure constituted of a cover and a main body. A speaker 1 is used to output a voice of a call partner in an audio communication. A main display panel 2 is provided to the cover, and constituted of a color liquid crystal display. When the terminal is used as a mobile phone terminal, the main display panel 2 displays various kinds of communication information. On the other hand, when the terminal is used as a digital camera, the main display panel 2 displays a finder or editing contents of picked-up image data. An antenna 3 is provided on a rear surface of the main body, and is extendable. An operation portion 4 is provided on a front surface of the main body, and constituted of various kinds of function keys (a camera key 41, an address book key 42, a cruciform key 43, and a determination key 44), ten keys 45, a clear key 46 and others. As will be described later, a camera function (an imaging unit 71 and an image processing unit 18) is activated when the camera key 41 is operated.

The address book key 42 is operated when activating an address book mode. The cruciform key 43 is used to direct a movement of a cursor when various kinds of information are displayed in the main display panel 2, and the determination key 44 is used to direct determination in various kinds of selection operations. Further, the ten keys 45 are used to input not only a dial number but also character data in the address book or creation of a mail, and the clear key 46 is operated when canceling an input or selected contents. A microphone 5 is used to input a voice of a user in an audio communication. A sub-display panel 6 is provided on the rear surface of the cover, displays a status in a closed state, or reads and displays a caller's name from an address book data storage area 17 when there is an incoming call. An LED 8 emits light when detecting an incoming call. An image is picked up through an imaging lens 7 when the camera function is activated. A notification speaker 9 outputs a notification sound (melody) when there is an incoming call.

FIG. 1C shows a display layout of the main display panel 2 when the imaging unit 71 is activated. In the first embodiment, an image having a layout as shown in FIG. 1C is displayed when a camera mode is activated (including an activation of the camera mode from an address book mode) Reference numeral 201 denotes an icon showing a current communication environment state, and it constantly searches a peripheral communication environment even in the camera mode and shows a result of search in the number of bars. Reference numeral 202 designates an icon showing a residual capacity of a battery, and 203 denotes a current time. Furthermore, reference numeral 204 designates an arrow icon used to clearly show zoom-up, and this icon controls the electronic zoom of the imaging unit 71 in an enlarging direction in response to an operation of the cruciform key 43 in the upward direction by a user and reflects a result in a monitor display area 206. Reference numeral 205 denotes an arrow icon used to clearly show zoom-out, and this icon controls the electronic zoom of the imaging unit 71 in a reducing (wide) direction in response to an operation of the cruciform key 43 in the downward direction by a user and reflects a result in the monitor display area 206. The monitor display area 206 is controlled by a driver 21 to display an image picked up by the imaging unit 71 with a resolution according to an image pickup mode in real time, and displays an image with a corresponding resolution in an image editing operation after storing an image. Reference numeral 207 denotes a function display area, and this area urges an operation of the camera key 41 in the operation portion 4 when a user executes a function specified in the function display area 207. Reference numeral 208 designates a function display area, and this area urges an operation of the determination key 44 in the operation portion 4 when a user executes a function specified in the function display area 208. Reference numeral 209 denotes a function display area, and this area urges an operation of the address book key 42 in the operation portion 4 when a user executes a function specified in the function display area 209.

FIG. 1D shows a display layout when display of the address book mode, originating call/incoming call histories or a list of various kinds of data stored in an RAM 17 is instructed by a user. Reference numeral 210 denotes an arrow icon which specifies switching of respective tabs 212, 213 and 214 which will be described later, and this icon switches the tabs 212, 213 and 214 in response to an operation of the cruciform key 43 in a leftward direction by a user. Reference numeral 211 designates an arrow icon which specifies switching of the respective tabs 212, 213 and 214 which will be described later, and this icon switches the tabs 212, 213 and 214 in response to an operation of the cruciform key 43 in a rightward direction by a user. The tabs 212, 213 and 214 are provided in order to mainly set/specify detailed display contents in display of a list, and they are classified in accordance with categories of the address book or classified in accordance with contents to be displaced even in case of the same record. Reference numerals 215, 216 and 217 denote data display areas which display various kinds of information associated as one set of records, and three sets of areas 215, 216 and 217 are displayed per page at a time. Moreover, an area to display an image picked up in the camera mode is also provided to each of these display areas. It is to be noted that icons 204 and 205 in FIG. 1D specify operations of the cruciform key 43 in the upward and downward directions by a user, and these icons detect operations in the upward and downward directions and display current data in the list display in a discriminating manner by focusing or highlighting the current data.

Incidentally, in this embodiment, when explaining cases in which a user "selects," "instructs" or "opens a sub-menu" with reference to display examples of the main display panel 2, these operations mean to operate the camera key 41, the determination key 44 and the address book key 42 in accordance with contents displayed in the function display areas 207, 208 and 209 in detail.

Figure 2:
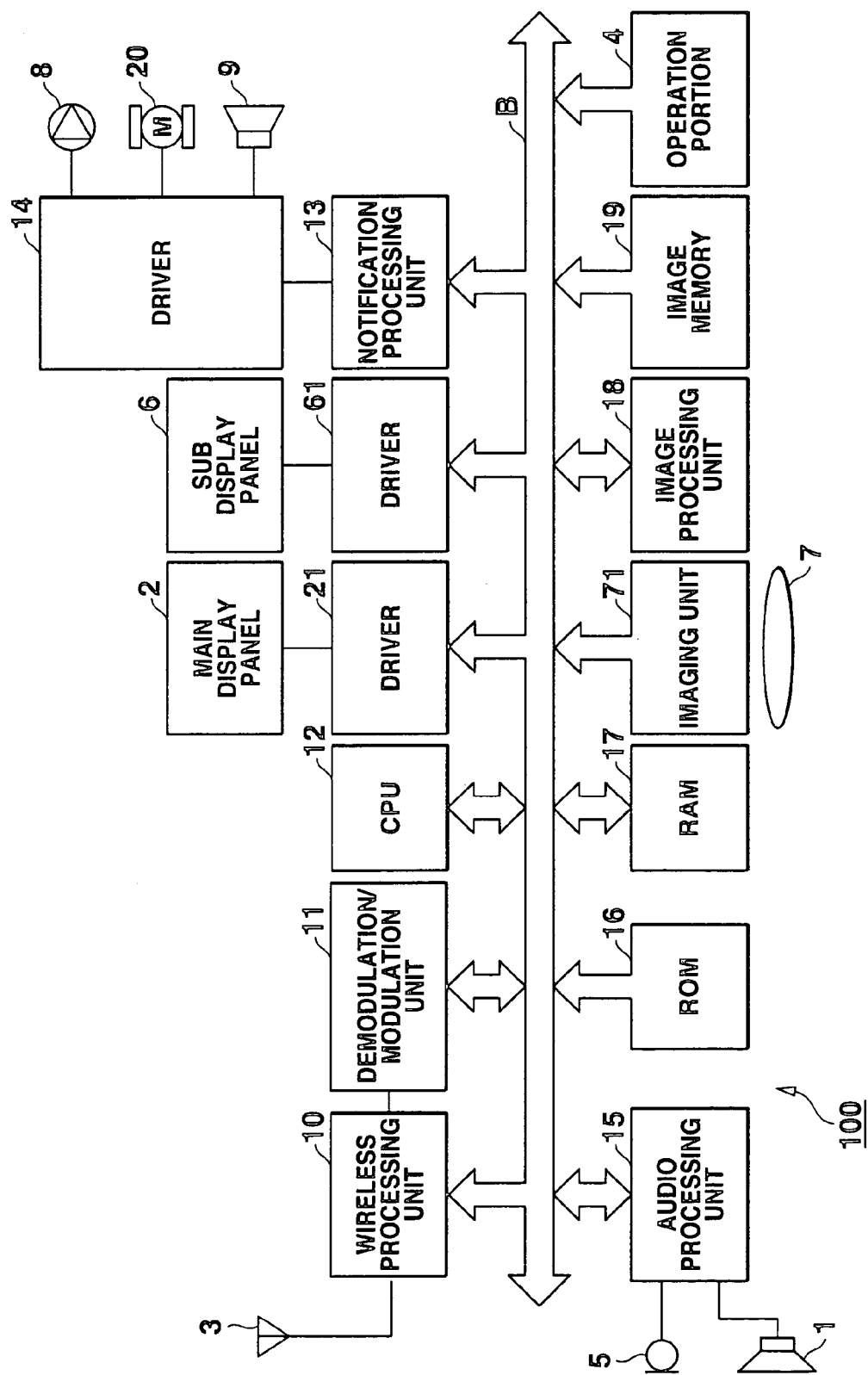
FIG. 2 is a block diagram showing a structural example of the mobile phone terminal according to the first embodiment of the present invention.

FIG. 2 is a block diagram showing a structural example of a mobile phone terminal 100 according to the first embodiment of the present invention. In the mobile phone terminal 100, a wireless processing unit 10 transmits/receives a wireless signal through the antenna 3 in accordance with a control signal of a CPU 12, and performs primary modulation/primary demodulation processing based on the CDMA mode. A demodulation/modulation unit 11 modulates audio data which is input through a bus B in accordance with a control signal of the CPU 12 and digital-processed based on the CELP mode and other text data and image data based on the QPSK mode and outputs a result to the wireless processing unit 10. On the other hand, the demodulation/modulation unit 11 demodulates data input by the wireless processing unit 10 and outputs a result to the bus B. The CPU 12 performs individual controls and an entire control. The main display panel 2 and the sub-display panel display various kinds of data through a driver 21 and a driver 61 based on the control by the CPU 12, respectively.

A notification processing unit 13 controls a driver 14 based on the control by the CPU 12, and the driver 14 drives the above-described LED 8, the notification speaker 9 and a built-in vibrator 20. The operation portion 4 outputs various kinds of instructions such as input of a phone number, scrolling, selection of options or data. An audio processing unit 15 CELP-encodes an audio input through the microphone 5 and outputs a result. On the other hand, it converts a CLEP code input through the bus B into an audio signal and outputs it from the speaker 1. An ROM 16 stores a terminal ID or a phone number of this mobile phone terminal 100, user profile data, a program of the CPU 12 (address book data viewing/creating/editing program) and image data such as a background and a stamp. The RAM 17 is used as a work area to store data required for the CPU 12 to operate, and includes an area to store later-described address book data or link information. The imaging unit 71 includes an image pickup device formed of a CMOS or a CCD, a DSP and others, and digital-processes an image formed through the imaging lens 7. The image processing unit 18 includes a processor to perform compression encrypting processing with respect to an image picked up by the imaging unit 71 or synthesizing processing in a third embodiment in particular. An image memory 19 stores image data picked up by the imaging unit 71 or received.

Figure 3:
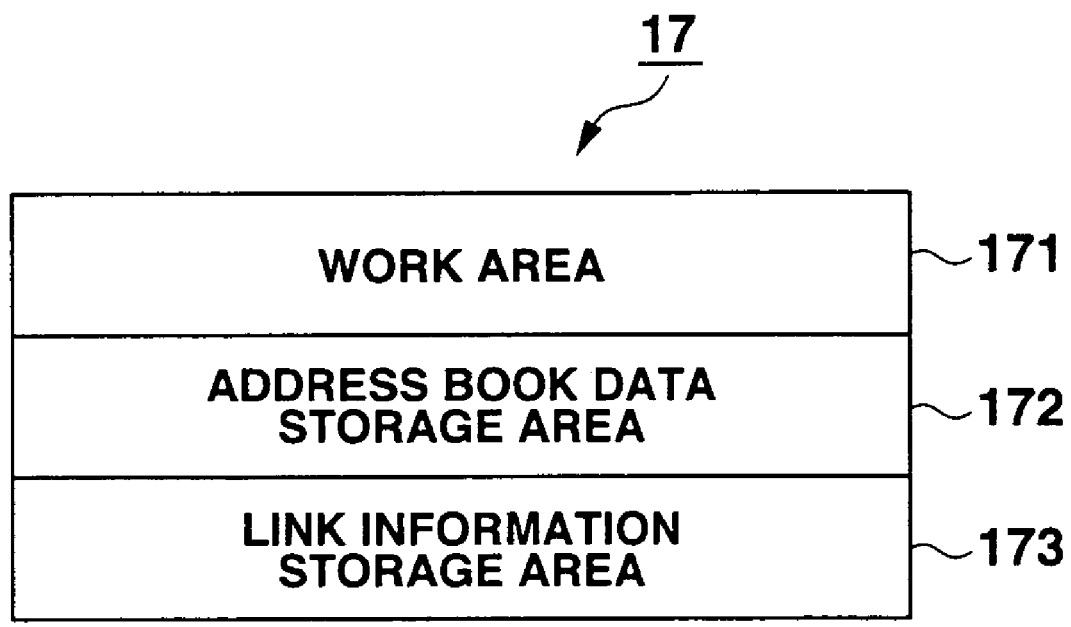
FIG. 3 shows a structural example of an RAM shown in FIG. 2.

FIG. 3 shows a structural example of the RAM 17 shown in FIG. 2. In the RAM 17 are set a work area 171 for the CPU 12 as well as an address book storage area 172 including contact telephone numbers and a link information storage area 173.

FIG. 4 shows a structural example of the image memory 19 shown in FIG. 2. There are areas which store record Nos. of image data to be stored, file names, folder attributes, . . . , flags indicative of presence/absence of links of image data, and it is determined that there is a link when a flag "1" is stored in the flag area.

1-2. Operation of First Embodiment

Figure 5:
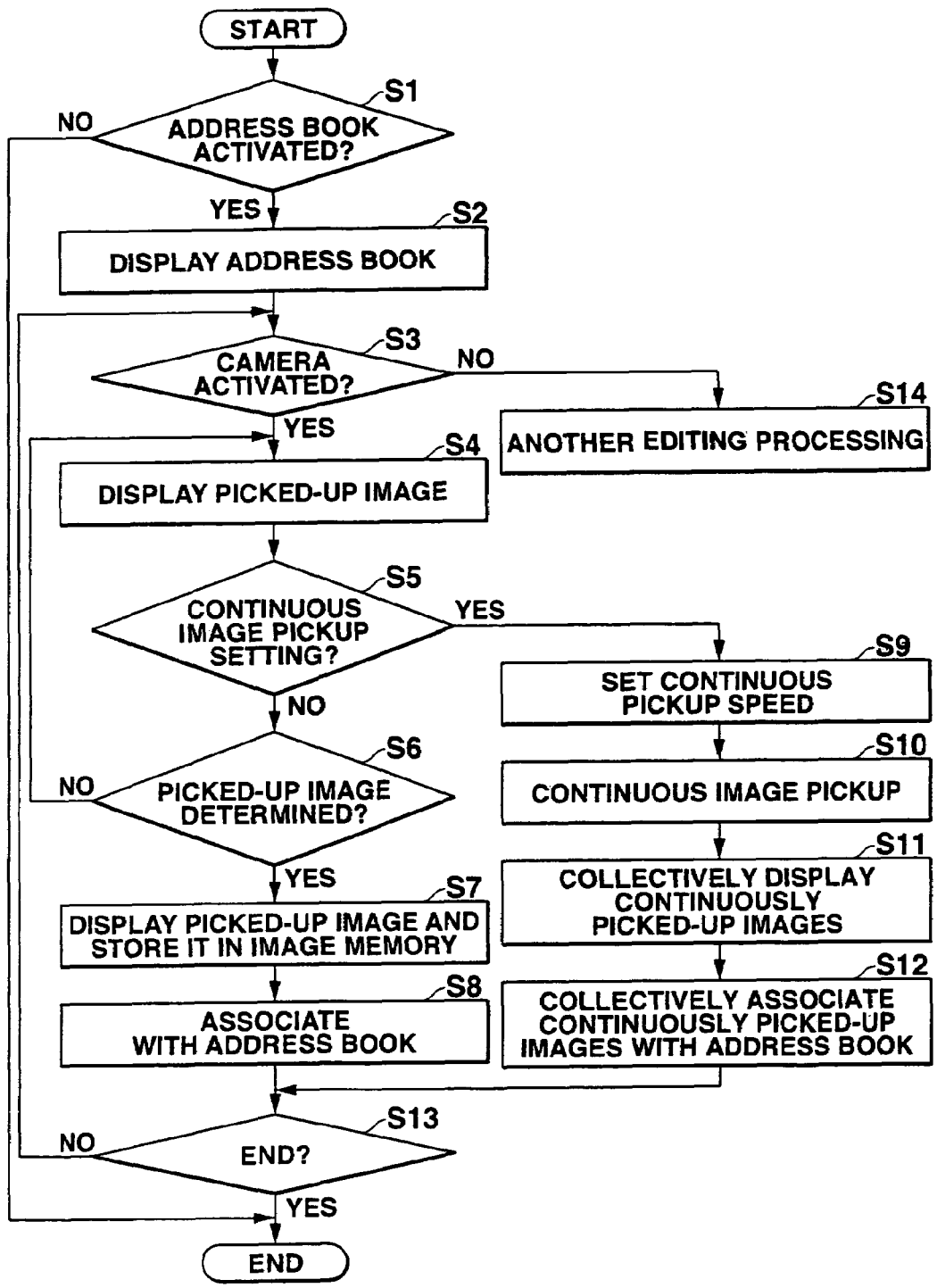
FIG. 5 is a flowchart showing an operation procedure to associate/store image data with/in address data in the mobile phone terminal according to the first embodiment.
Figure 6A:
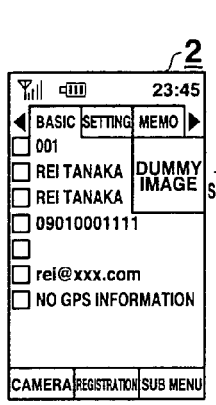
FIGS. 6A, 6B, 6C, 6D, 6E, 6F, 6G, 6H and 6I are views showing screen examples displayed when storing an associated image in the address book of the mobile phone terminal according to the first embodiment.

An operation of the first embodiment will now be described with reference to a flowchart of FIG. 5. When the CPU 12 detects an address book mode activation command by detecting an operation of the address book key 42 in an incoming call waiting state at step S1, the CPU 12 activates the address book viewing/creating/editing program from the ROM 16 and displays an address book data new creation screen as shown in FIG. 6A or an existing data edition screen in the main display panel 2 at step S2.

Figure 6B:
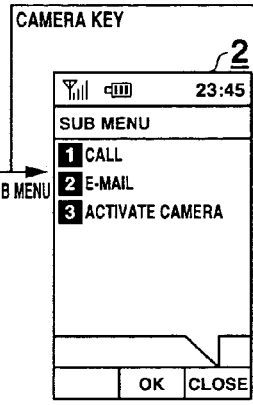
Figure 6C:
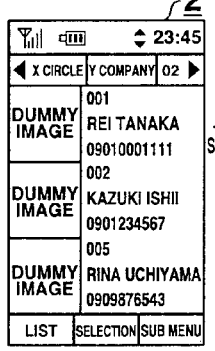
Figure 6D:
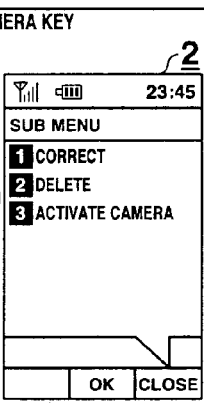
Figure 6E:
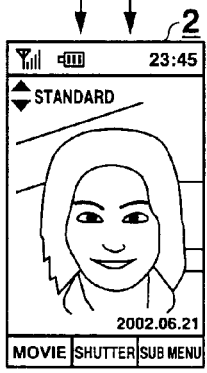

When "001 Rei Tanaka's address data" in this address book data editing screen is highlighted and selected as an editing target, a sub menu as shown in FIG. 6B is displayed in the main display panel 2 by detecting an operation of the address book key 42 by a user. It is determined at step S3 whether or not the camera is activated ("activation of the camera" is selected or the camera key 41 is pressed).

If it is not determined that the camera is activated, the processing advances to step S14. If it is determined that the camera is activated, the processing proceeds to step S4. At step S4, the imaging unit 71 is activated, and the driver 21 sets a resolution of the monitor display area 206 corresponding to an image obtained by the imaging unit 71 to display the image. Then, the CPU 12 determines whether a continuous pickup mode is set at step S5. The processing advances to step S9 if it is set, and the processing proceeds to step S6 if it is not set.

Figure 6F:
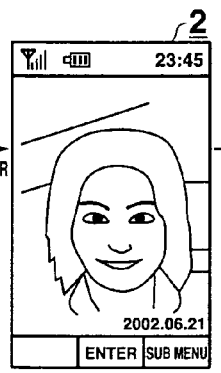

Thereafter, when the CPU 12 detects an operation of the determination key 44 and determines a picked-up image at step S6, it applies compression encrypting processing to image data of this displayed image in the image processing unit 18 and stores an encrypted data in the image memory 19 at step S7. As a result, such a picked-up image as shown in FIG. 6F can be determined.

Figure 6G:
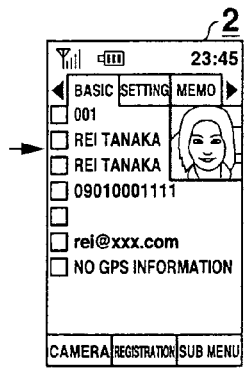

Then, when a user instructs an association/storing of this determined image with/in 001 Rei Tanaka's address book area by operating the determination key 44, the CPU 12 sets the image display link "1" in 001 Rei Tanaka's address data area in the address book data storage area 172 shown in FIG. 7, stores a record number 001 of the image memory 10 storing the image data in the link information storage area 173 shown in FIG. 8 in association with 001 of the address book data storage area 172, reduces the image based on this image data in size while temporarily lowering the resolution in accordance with the display layout of FIG. 20 and displays a result in the editing screen in the main display panel 2 as shown in FIG. 6G at step S8. The CPU 1 returns to the processing of step S3 until it is determined that the editing processing in the address book mode is terminated at step S13.

Figure 6H:
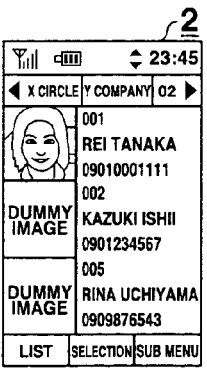
Figure 6I:
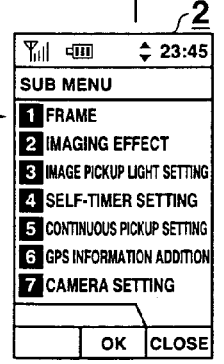

Therefore, when returning from this state to the regular address book viewing state, Rei Tanaka's image is displayed together with Rei Tanaka's address data as shown in FIG. 6H, and it can be confirmed that Rei Tanaka's image data is associated/stored with/in the address book data.

Meanwhile, when the picked-up image before determination is displayed in the main display panel 2 as shown in FIG. 9A, a user opens such a sub menu as shown in FIG. 9B, selects the continuous pickup setting, selects a continuous pickup speed from "fast/moderate/slow" in the continuous pickup setting as shown in FIG. 9F, and shifts to the continuous pickup mode. As a result, the CPU 12 advances from step S5 to step S9, sets the continuous pickup speed, continuously takes a plurality of pictures of such image data as shown in FIG. 9C at step S10 (takes a plurality of pictures in a fixed time), and collectively displays the continuously picked-up image as shown in FIG. 9D at step S1.

When a user sees these pictures and determines to store the continuously picked-up images in the address book, the CPU 1 sets the flag "1" in the storage position in the memory 19 for the plurality of continuously taken pictures of the image data, and writes link information for the plurality of pictures of the image data in the link information storage area 173 at step S12.

Specifically, the CPU 12 sets the image display link flag "1" in 001 Rei Tanaka's address data area in the address book shown in FIG. 7, stores a plurality of record numbers of the image memory 10 storing the plurality of stored continuously taken pictures of the image at 001 in the data storage area of the address book in the link information storage area 173 shown in FIG. 8, and displays an image based on the first image data in the editing screen of the main display panel 2 as shown in FIG. 9D.

Therefore, when returning from this state to regular display of the address book data, the first image in Rei Tanaka's continuously picked-up images is displayed together with Rei Tanaka's address data in the main display panel 2 as shown in FIG. 9E, and it can be confirmed that Rei Tanaka's image data is associated with the address book data and stored.

According to the first embodiment, when associating the image data with the address book data and storing it, the picked-up image can be obtained by activating the camera during editing of the address book data, and this picked-up image can be associated/stored with/in the address book during editing, thereby improving the usability of the address book. Further, the pickup mode can be set to the continuous pickup setting during the address book data editing, and a plurality of continuously picked-up images can be directly collectively stored in the address book, thus simplifying the storing operation.

Figure 10A:
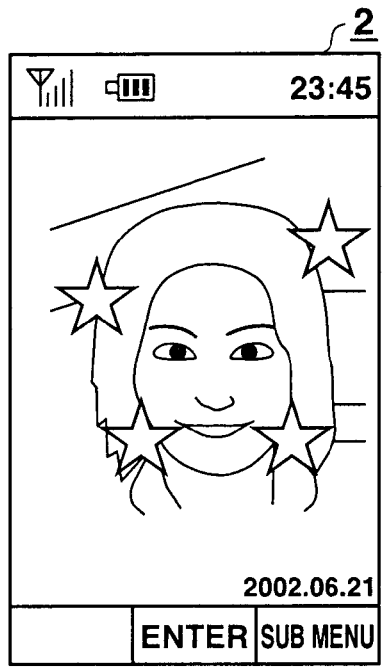
FIGS. 10A and 10B are views showing processing examples of image data associated/stored with/in address book data in the mobile phone terminal according to the first embodiment.
Figure 10B:

It is to be noted that such an image as shown in FIG. 9G can be continuously picked up by the manual operation when manual is selected in the continuous pickup speed setting shown in FIG. 9F. Furthermore, like the regular camera activation, a special effect can be selected from the menu immediately after image pickup (which can be also performed during image pickup) in order to apply effects such as monotone, sepia, stamp application or the like to picked-up images. Moreover, desired image processing can be applied on the spot before holding the link in the address book, and such a processed image as shown in FIG. 10A can be immediately associated with the address book data which is currently in the editing operation and it can be stored by the same operation as that described above. Such a synthesized image as shown in FIG. 10B can be associated/stored with/in the address book.

Figure 11A:
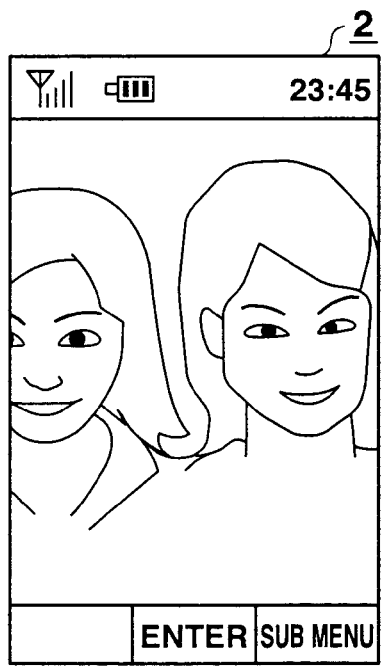
FIGS. 11A and 11B are views showing a synthesis example of image data associated/stored with/in address book data in the mobile phone terminal according to the first embodiment.
Figure 11B:

Additionally, like the regular camera activation, synthesis image pickup is possible during the image pickup operation. First picture can be taken, a second picture can be taken so as to be aligned with the first picture, and then they are synthesized and determined as one picked-up image as shown in FIG. 11A. It can be immediately associated with the address book data which is currently in the editing operation and then stored by the same operation as that described above. Such a synthesized image as shown in FIG. 11B can be displayed in the address book.

Figure 12A:
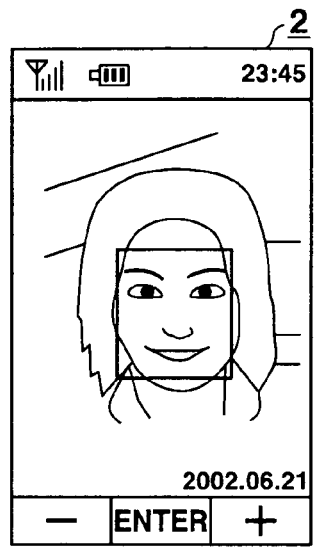
FIGS. 12A, 12B and 12C are views showing trimming examples of image data associated/stored with/in the address book in the mobile phone terminal according to the first embodiment.
Figure 12B:
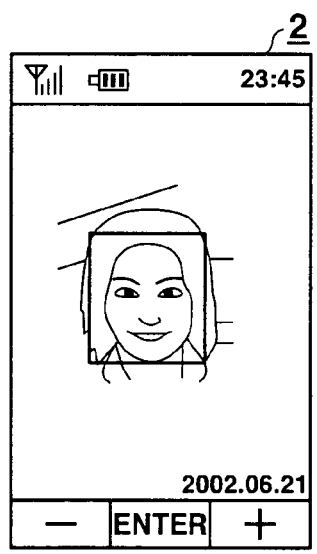
Figure 12C:
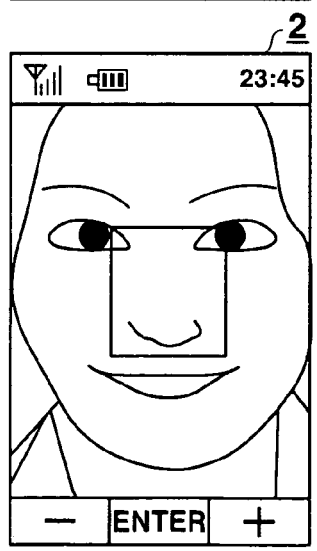

Further, when a frame 111 whose size is the same as that displayed in the address book data is displayed in a preview screen such as shown in FIG. 12A immediately after activating the camera and taking a picture of an object and a position of this frame is specified, a trimmed image such as shown in FIGS. 12B and 12C can be associated/stored with/in the address book data by the same operation as that described above.

Figure 13B:
FIGS. 13A, 13B, 13C, 13D and 13E are views showing enlarged and reduced examples of image data associated/stored with/in address book data in the mobile phone terminal according to the first embodiment.
Figure 13C:
Figure 13A:
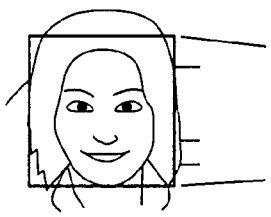

Furthermore, even in case of viewing data such as that in the address book with/in which image data is associated/stored by the operation of the foregoing embodiment, since a resolution is not lowered in accordance with the address book data (record) nor the data size is not reduced, such an image with an original resolution as shown in FIG. 13A linked to the image memory 19 can be enlarged/reduced on the spot by using, e.g., the cruciform key 43. Therefore, a part to be displayed can be readily adjusted even after the data registration (after determination and saving).

Figure 13D:
Figure 13E:

Moreover, even after the image data is associated and stored, it is possible to easily perform positioning or the like with a larger degree of freedom as well as enlargement/reduction by shifting a display position in the vertical and horizontal directions by using the cruciform key 43. For example, states in FIGS. 13B and 13C change to states in FIGS. 13D and 13E when performing enlargement/reduction of a linked image in the image memory 119 by using a predetermined key operation during viewing the address book data and then again returning to the address book data. It is to be noted that the states in FIGS. 13D and 13E can be returned to the states in FIGS. 13B and 13C.

2. Second Embodiment

Figure 14:
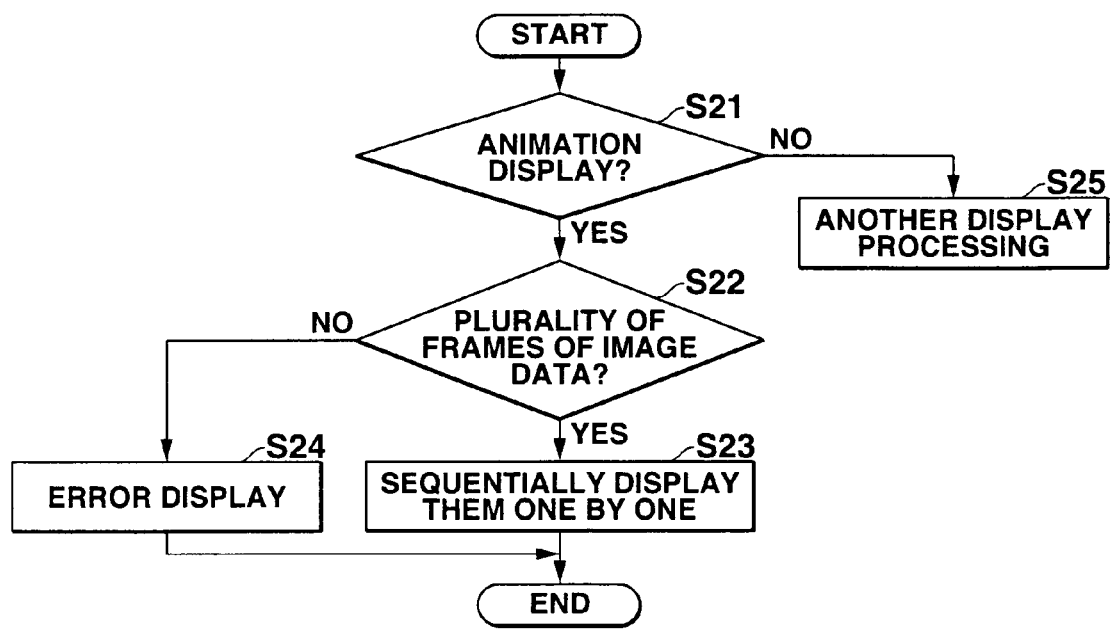
FIG. 14 is a flowchart showing an address book data viewing operation of a mobile phone terminal according to a second embodiment of the present invention.

A second embodiment according to the present invention will now be described. FIG. 14 is a flowchart showing a viewing operation in an address book mode of a mobile phone terminal according to the second embodiment of the present invention. Since the structure of the second embodiment is the same as that in the first embodiment, explanation of the operation of respective parts having the same structure will be eliminated, and a different part in that operation will be described hereinafter.

In this embodiment, a description will be given as to a display operation when a user performs the animation display setting in order to view a plurality of frames of image data associated/stored with/in an address book in cases where a plurality of images are stored in address data of the address book due to continuous image pickup or the like. However, the animation display means to switch and display images one by one, e.g., every two seconds.

The CPU 12 determines whether the animation display is set at step S21. If the animation display is not set, the processing advances to another display processing at step S25. If the animation display is set, the processing proceeds to step S22.

At step S22, it is determined whether a plurality of frames of image data are associated with and stored in the currently selected address book data in a mode to display the address book. If the plurality of frames of image data are not stored, error display is performed and the processing is terminated at step S24. On the other hand, if the plurality of frames of image data are stored, the processing advances to step S23.

Figure 15:
FIG. 15 is a view showing a plurality of image data examples in an image memory associated/stored with/in address book data of the mobile phone terminal according to the second embodiment.
Figure 16:
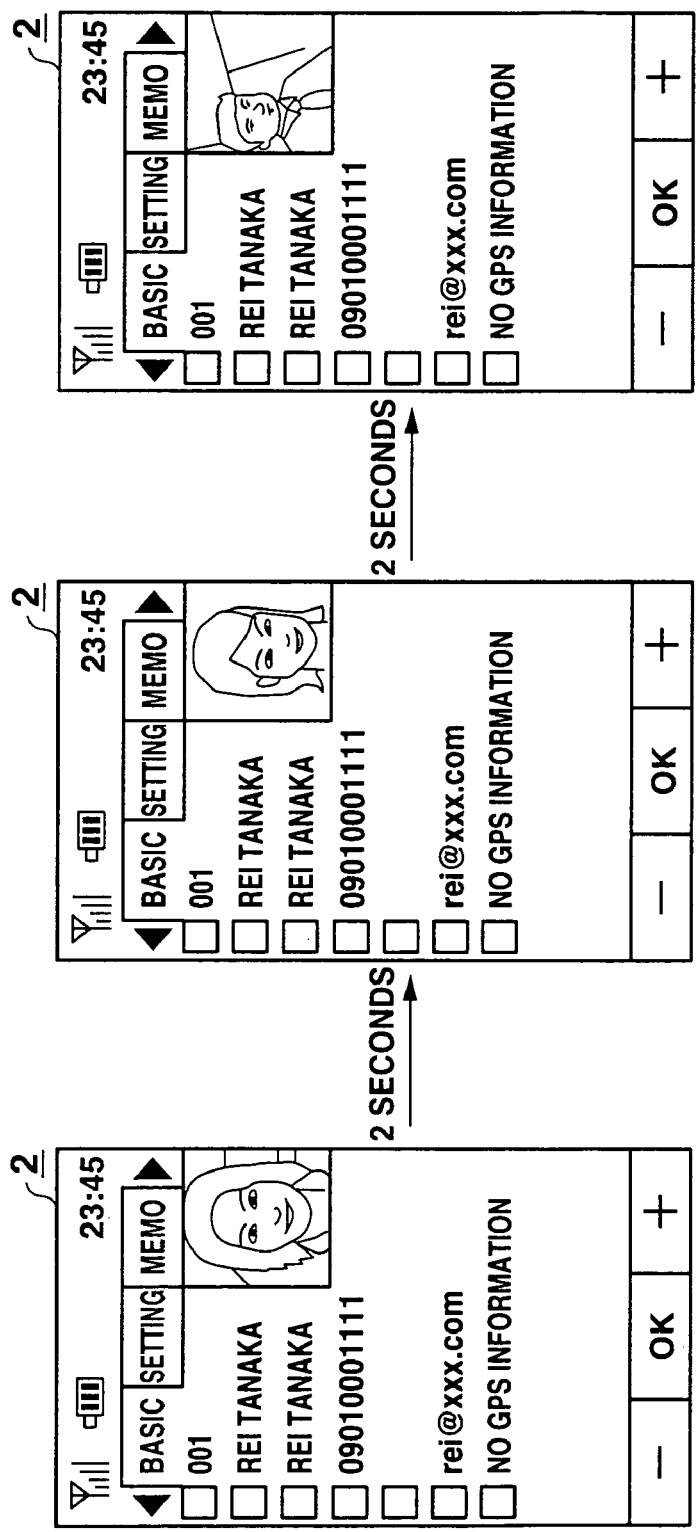
FIGS. 16A, 16B and 16C are views showing screen examples when displaying a plurality of frames of image data shown in FIG. 15 in an animation form.

The CPU 12 once reads record numbers in an image memory 19 for the plurality of frames of image data stored in the currently selected address data by using a link information storage area 173, and stores them in a work area 171. Then, the CPU 12 sequentially reads a plurality of corresponding frames of image data such as shown in FIG. 15 from the image memory 19 based on these record numbers, and displays images in an image display area in a main display panel 2 one by one every predetermined time as shown in FIGS. 16A, 16B and 16C.

According to the second embodiment, since a plurality of frames of image data associated with and stored in the address book can be viewed in the animation display, it is possible to be aware of which image data is associated and stored, a visual interest factor based on the animation display can be produced.

Figure 17:
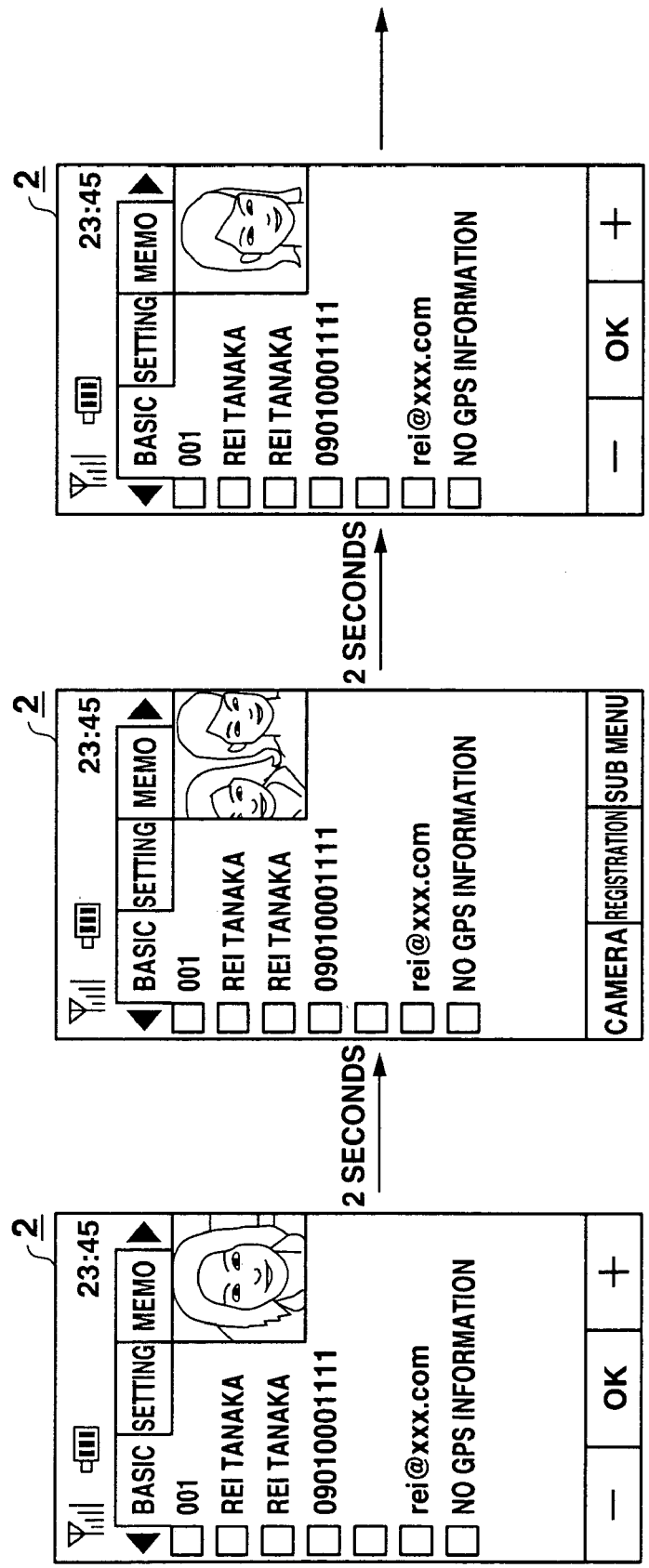
FIGS. 17A, 17B and 17C are views showing screen examples when displaying a plurality of frames of image data shown in FIG. 15 in a slide form.

It is to be noted that a plurality of frames of image data associated with and stored in the address book are viewed in the animation display in the second embodiment, but the same advantages can be obtained by performing slide display of images one by one in the horizontal direction in the address book data image display area of the main display panel 2 every predetermined time as shown in FIGS. 17A, 17B and 17C.

3. Third Embodiment

Figure 18:
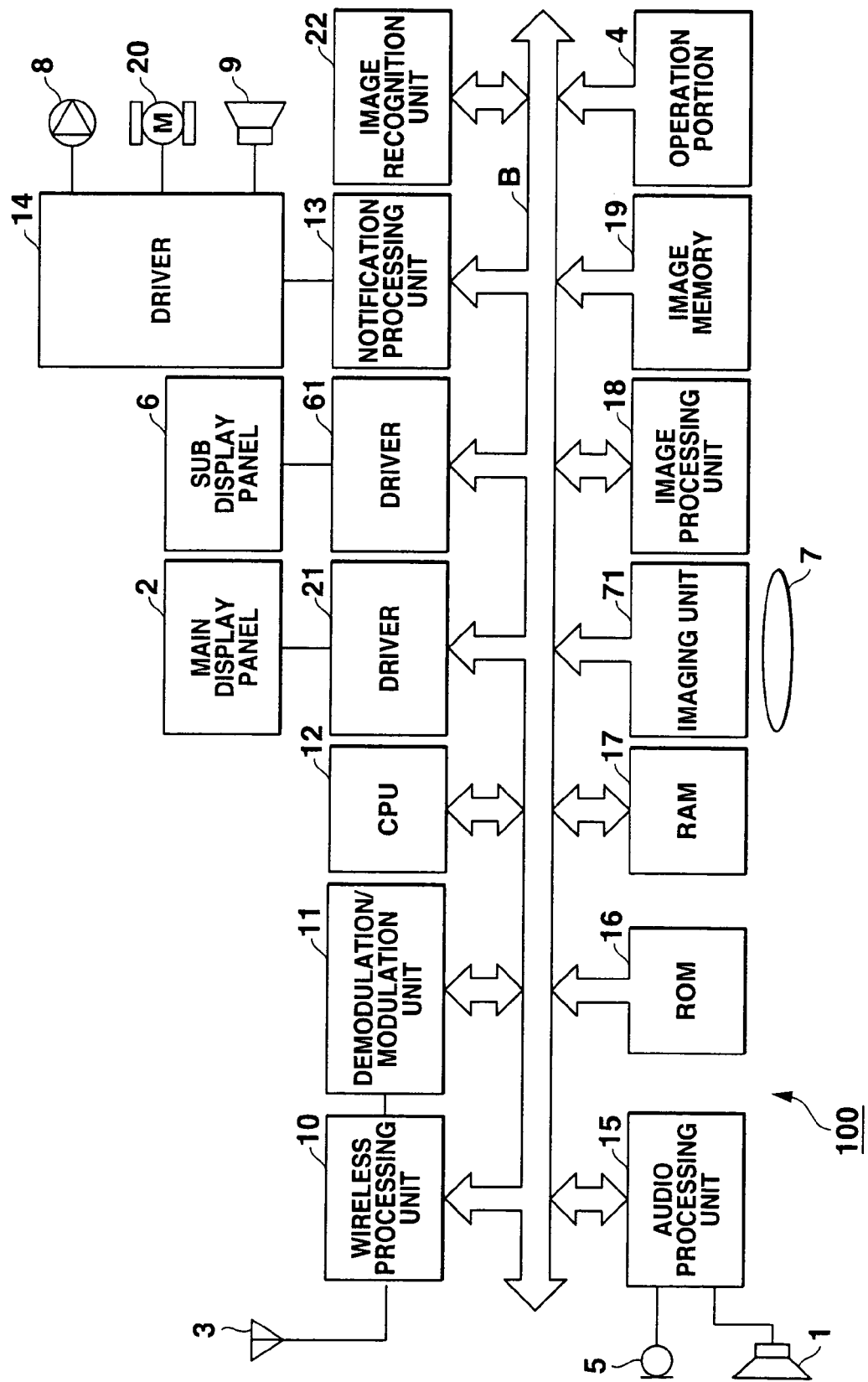
FIG. 18 is a block diagram showing a structural example of a mobile phone terminal according to a third embodiment of the present invention.

FIG. 18 is a block diagram showing a structural example of a mobile phone terminal according to a third embodiment of the present invention. Like reference numerals denote parts equal to those in the first embodiment shown in FIG. 1, and their explanation will be appropriately eliminated.

The mobile phone terminal 100 has the antenna 3, wireless processing unit 10, demodulation/modulation unit 11, CPU 12, drivers 21, 61 and 14, main display panel 2, sub display panel 6, notification processing unit 13, LED 8, vibrator 20, notification speaker 9, audio processing unit 15, microphone 5, speaker 1, ROM 16, RAM 17, imaging lens 7, imaging unit 71, image processing unit 18, image memory 19, operation portion 4 as well as image recognition unit 22 which extracts only a person portion from image data.

Figure 19:
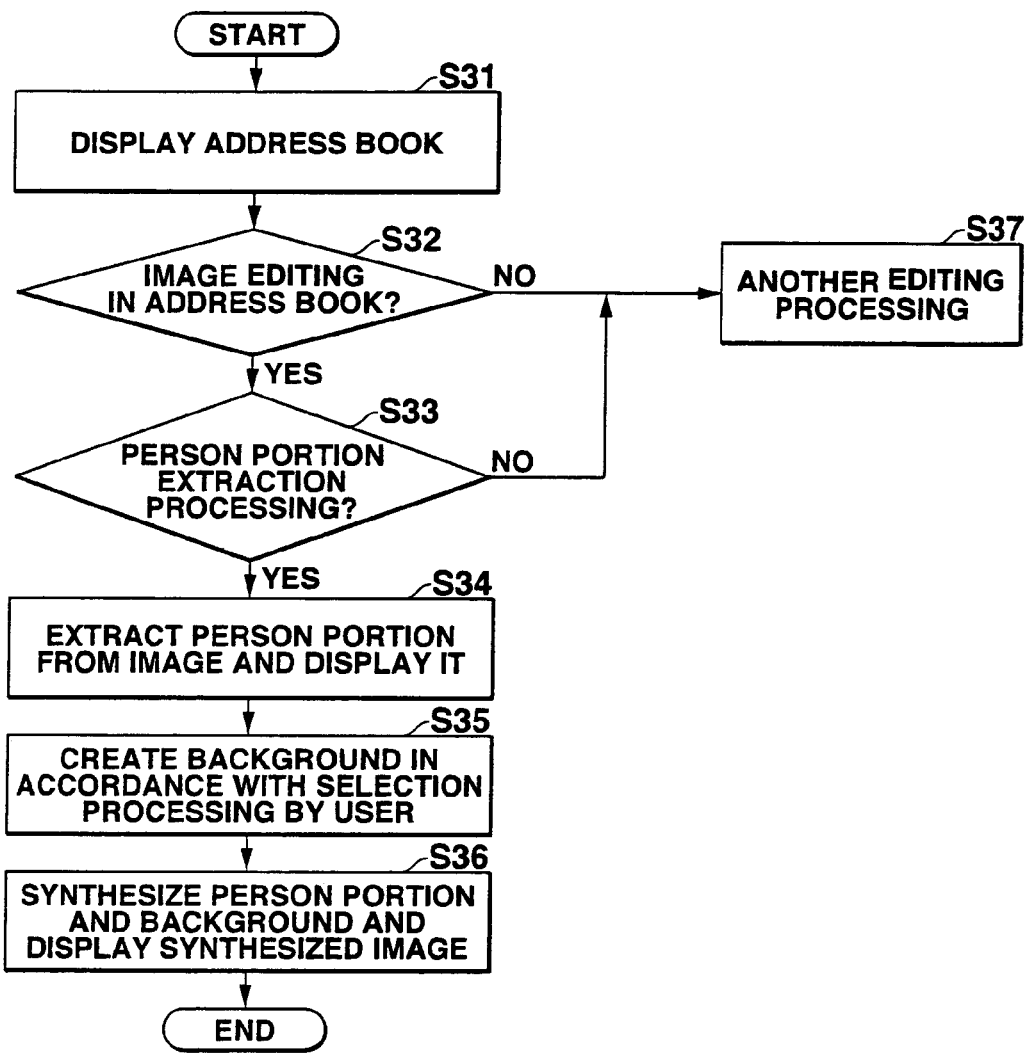
FIG. 19 is a flowchart showing an operation procedure to process a background of image data associated/stored with/in address book data of the mobile phone terminal according to the third embodiment.

Editing of image data in an address book data viewing operation of the mobile phone terminal 100 will now be described with reference to a flowchart shown in FIG. 19. In editing of image data in the viewing operation, a person image portion is extracted from image data which has been already associated with and stored in address book data or the like, this portion is synthesized with a selected background in order to create desired image data, and a result is again associated with and stored in the address book data.

First, when a user activates an address book data viewing/creating/editing mode, the CPU 12 activates an address book data viewing/creating/editing program at step S31, and displays it in the main display panel 2 as shown in FIG. 20A. When a user operates the operation portion 4 from this display screen, selects address book image editing and further selects person portion extraction processing, the CPU 12 judges these operations and performs the following processing.

That is, in response to these operations, the CPU 12 determines whether these operations correspond to the address book image editing at step S32. Then, if they do not correspond to the address book image editing, the processing advances to another editing processing at step S37. If they correspond to the address book image editing, the processing proceeds to step S33.

At step S33, it is determined whether the processing is the person portion extraction processing. Then, if it is the person portion extraction processing, the processing advances to step S34, a person portion is recognized and extracted from such image data as shown in FIG. 20B by the image recognition unit 22, and it is displayed in the main display panel 2 as shown in FIG. 20C.

The image recognition unit 22 has a plurality of human face patterns, and recognizes human faces based on colors and positional relationships between color blocks. At the same time, it also recognizes clothes based on the continuity of color information connected to the human faces. As a result, it recognizes only a person including body parts, and executes an operation to extract only that part.

On the other hand, a user opens such a sub menu as shown in FIG. 20D in the main display panel 2, and selects an item "background" in order to create the background of the image data shown in FIG. 20C. Then, various kinds of background patterns and background colors such as shown in FIG. 20E are displayed, and thus a desired background pattern or background color is selected from them.

This selection aims at creating a further preferable image by applying a color pattern or a design (=superposing it as a background) on a transparent part around a person with respect to person data recognized by the image recognition unit 22. Here, a white color is selected as a background color, for example.

In response to this, the CPU 12 creates a background of, e.g., a white color in accordance with the selection processing performed by a user at step S35, synthesizes with the image data shown in FIG. 20C at step S36, and displays a thus created synthesized image in an image display area of the address book as shown in FIG. 20F.

According to the third embodiment, by recognizing only a person portion from image data stored in, e.g., the address book and applying a color or synthesizing a pattern with respect to any other part of the image data formed of only the person, a background of the image data can be processed into a desired form, and representation of the image data associated with and stored in, e.g., the address book can be readily effected.

Meanwhile, as to the address book data, there is usually stored telephone number data or e-mail address data. If there is an incoming call/mail-reception from a telephone number, an e-mail address or the like in such data, it is possible set to generate a dedicated melody, but performing such setting each time is troublesome.

Thus, the image recognition unit 22 according to the third embodiment can be used to provide a function to recognize color information of image data associated with and stored in address book data and automatically select melody data in the mobile phone based on this color information.

Specifically, numbering such as 1, 2, 3, . . . is previously assigned to in-phone melody data stored in the ROM 16. For example, "1" means that red color information takes 90% or more in image data, and "2" means that an average of red color information is 90 to 80% in the same. This association table is stored in a table portion of the RAM 17. Then, averaging is performed by dividing a percentage of a red color in the color information of a stored image retrieved by the image recognition unit 22 by the number of dots, and reference is made to the table portion, thereby automatically setting an incoming call notification sound. It is to be noted that the color information is just an example, and the same advantages can be obtained by using the brightness or the like.

As a result, by automatically setting an incoming call notification sound based on color information or brightness information with respect to image data stored in address book data, an incoming call notification sound does not have to be selected. Furthermore, if an incoming call notification sound is forgot to be added, it can be automatically added. Moreover, although a description has been given as to automatic selection of a notification sound outputted from the notification speaker 9 in the third embodiment, it may be blinking/lighting patterns of the LED 8 or vibration patterns of the vibrator 20 when detecting an incoming call.

4. Fourth Embodiment

A fourth embodiment according to the present invention will now be described. FIG. 21 is a conceptual view showing a contents stored in an image recognition unit of a mobile phone terminal according to the fourth embodiment of the present invention. However, since an entire structure of this example is the same as that of the third embodiment, the explanation of its structure operation will be eliminated, and a characteristic part of its operation will be described hereinafter.

An image recognition unit 22 holds a plurality of items of coordinate data of three-dimensional images with respect to a person's facial part. This coordinate data has coordinates of parts which are characteristics of a face, e.g., eyes, a nose, a mouth or the like as well as a face line, and also has data base for required minimum coordinate data when seen from all directions (vertical and horizontal 360-degree directions).

Figure 22:
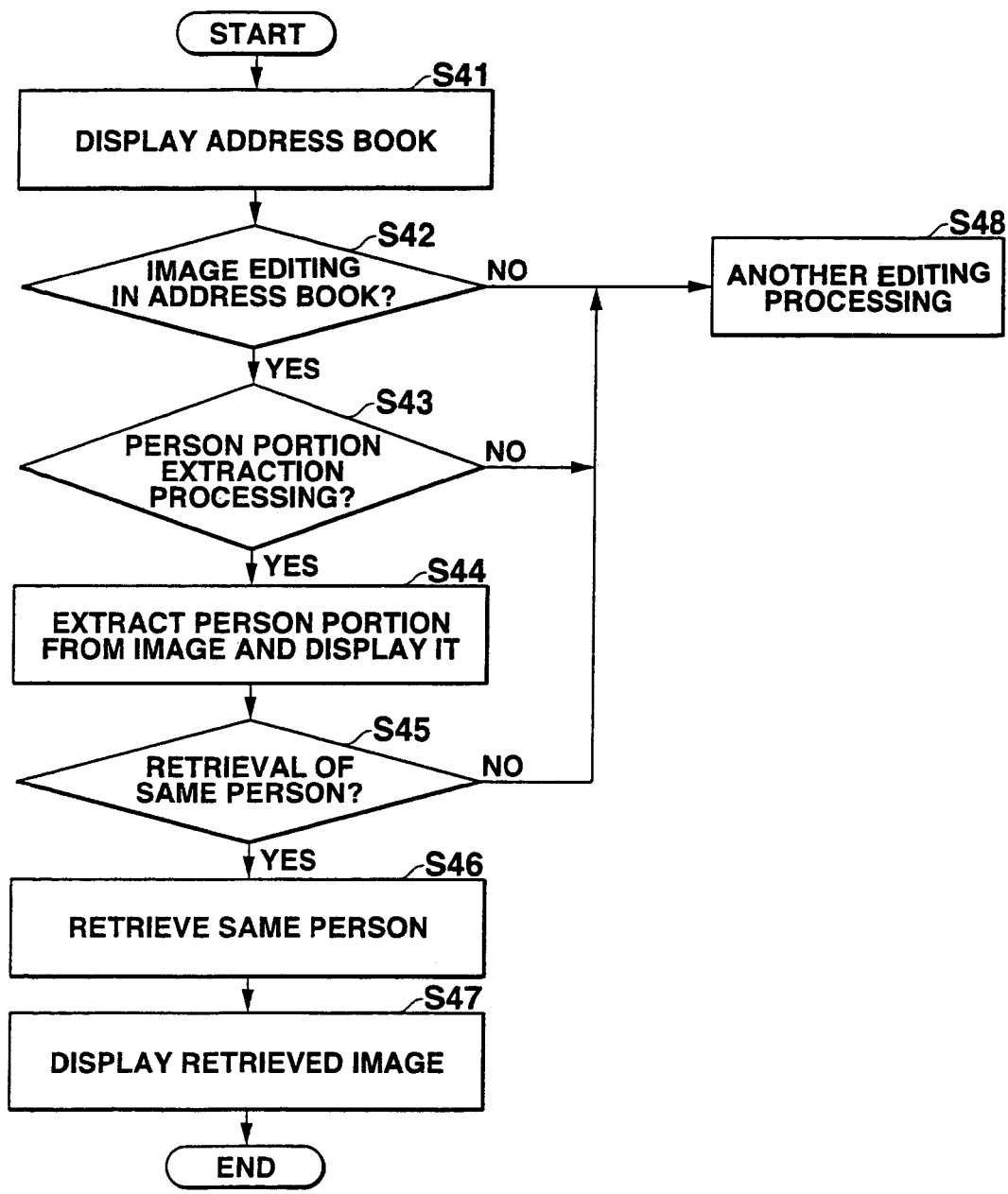
FIG. 22 is a flowchart showing a procedure to retrieve the same person as a person included in image data associated/stored with/in address book data of a mobile phone terminal according to a fourth embodiment.

An operation of the fourth embodiment will now be described with reference to a flowchart of FIG. 22. A CPU 12 reads and activates an address book data viewing/creating/editing program from an ROM 16 and displays a result in a main display panel 2 as shown in FIG. 23A at step S41. Then, at step S42, the CPU 12 determines whether an operation is the image editing. Moreover, if it is not the image editing, the processing advances to another editing processing at step S48. If it is the image editing, the processing proceeds to step S43.

At step S43, it is determined whether the processing is person portion extraction processing. Additionally, if it is not the person portion extraction processing, the control advances to step S48. On the other hand, if it is determined that the processing is the person portion extraction processing at step S43, original image data is read from an image memory 19 storing an image stored in such a target address book as shown in FIG. 23A, a person portion is recognized and extracted from this image data by the image recognition unit 22 and displayed in the main display panel 2 at step S44. The operation described thus far is the same as that in the third embodiment shown in FIG. 17.

Here, a user opens such a sub menu as shown in FIG. 23B in the main display panel 2 by operating an operation portion 4, and selects an item of, e.g., album. This is a command to retrieve from the image memory 19 image data showing the same person as that of the image data stored in the address book data and align and display the image data showing the retrieved person in an album format, and this command is input to the CPU 12.

In response to this command, the CPU 1 determines whether retrieval of the same person is selected at step S45. If it is not selected, the processing advances to step S48. If it is selected, the processing proceeds to step S46. At step S46, the CPU 12 uses the image recognition unit 22 to retrieve the image data showing the same person as the image stored in the address book data by using the image data in the image memory 19.

At this time, the image recognition unit 22 obtains closest coordinate data from such stored three-dimensional data as shown in FIG. 21 based on a positional relationship between a facial line, eyes, a mouth, a nose and others of a target person, and performs the same operation with respect to all the image data stored in the image memory 19, thereby acquiring coordinate data closest to each image data.

As a result, if even one frame of image data is stored in, e.g., the address book data, coordinate data close to such image data is obtained, and reference is made to the obtained data and each coordinate data with respect to the image data in the image memory 19. Consequently, an image showing only the same person can be extracted from the image memory 19, and a relevant image can be readily retrieved.

The CPU 12 aligns the retrieved image showing only the same person in the album format as shown in FIG. 23C and displays it in the main display panel 2 at step S47.

According to the fourth embodiment, an image showing the same person as that in an image stored in the address book can be retrieved from the image memory 19, a plurality of retrieved images can be displayed in the album format, and images showing the same person can be readily retrieved and viewed.

Therefore, it is easy to, e.g., retrieve images showing the same person as that in an image stored in the address book and store a favorite one among these images in the address book in place of the already stored image, thereby improving the efficiency of the address book image editing.

5. Fifth Embodiment

A fifth embodiment according to the present invention will now be described. In the fifth embodiment, a pickup size can be selected in a sub menu so as to cope with all pickup sizes in a regular camera mode. On the other hand, only a regular display size of a mobile phone and a full-screen display size of the mobile phone can be selected in activation of the camera mode from an address book in a mobile phone terminal with a camera of mega pixels.

FIG. 24 shows a table illustrating a difference in selectable pickup size in the regular camera mode stored in the ROM 16 and a camera mode from an address book. In the drawing, shaded portions show pickup sizes (or functions) which cannot be selected when the camera mode is activated from the address book. That is because image storage in the address book is possible up to a wallpaper size (desktop size), and hence image editing such as resizing or trimming is required when a picture is taken with any larger size. The image editing can be manually or automatically performed, but it is desirable to take a picture with a pickup size which can be stored without performing image editing in order to readily realize such editing with existing hardware or reduce the operation burden on a user. Therefore, image pickup with sizes exceeding pickup sizes enabling image storage in the address book is restricted.

In the example shown in FIG. 24, a regular display size of the mobile phone (120×160 dots) and a full-screen display size of the mobile phone (240×320 dots) can be selected when the camera mode is activated from the address book. As to pickup sizes selectable in the regular camera mode, the regular display size (120×160 dots) to UXGA (1600×1200 dots) of the mobile phone can be selected.

A list of the selectable pickup sizes (including functions) shown in FIG. 24 is saved in, e.g., the ROM 16 or RAM 17 shown in FIG. 1 as a camera control processing table.

Figure 25:
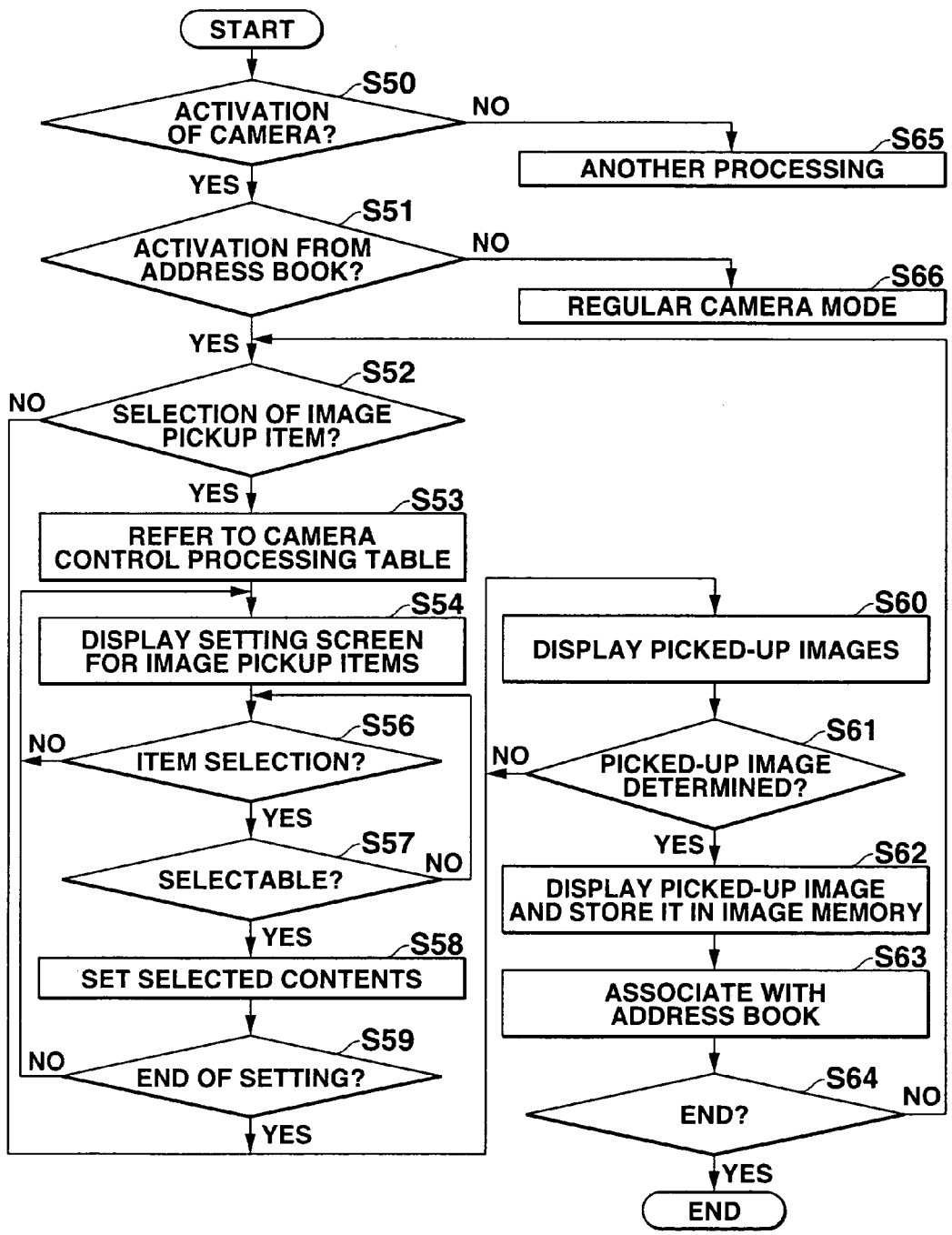
FIG. 25 is a flowchart illustrating an operation of a mobile phone with a camera according to the fifth embodiment.

A description will now be given as to an operation of the mobile phone with a camera according to the fifth embodiment. FIG. 25 is a flowchart illustrating an operation of the mobile phone with a camera according to the fifth embodiment. Further, FIG. 26 shows a display example of a sub menu in the camera mode according to the fifth embodiment. The CPU 12 determines whether the camera mode is activated at step S50. If the camera mode is not activated, the processing advances to another processing at step S65. If the camera mode is activated, the processing proceeds to step S51.

At step S51, it is determined whether the camera mode is activated from the address book. If it is not activated from the address book (it is activated from, e.g., a waiting screen), the processing advances to step S66, and the regular camera mode is executed. In the regular camera mode, all the pickup sizes and functions shown in FIG. 24 can be selected.

On the other hand, if the camera mode is activated from the address book, the processing proceeds to step S52, and it is determined whether selection of an image pickup item is instructed. If selection of the image pickup item is not instructed, the processing advances to a later-described step S60 in order to take a picture in the currently set pickup mode (pickup size or function).

Figure 26A:
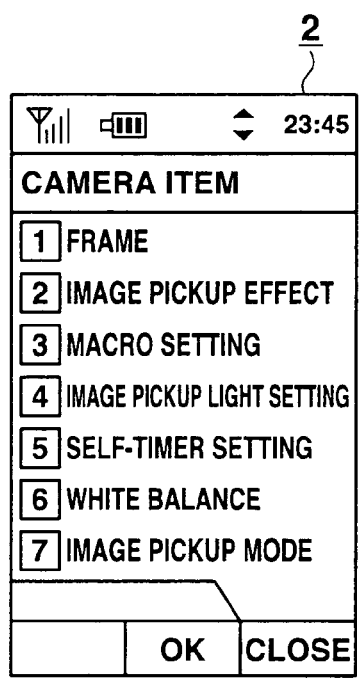
FIGS. 26A, 26B and 26C show display examples of a sub menu in the camera mode according to the fifth embodiment.
Figure 26B:
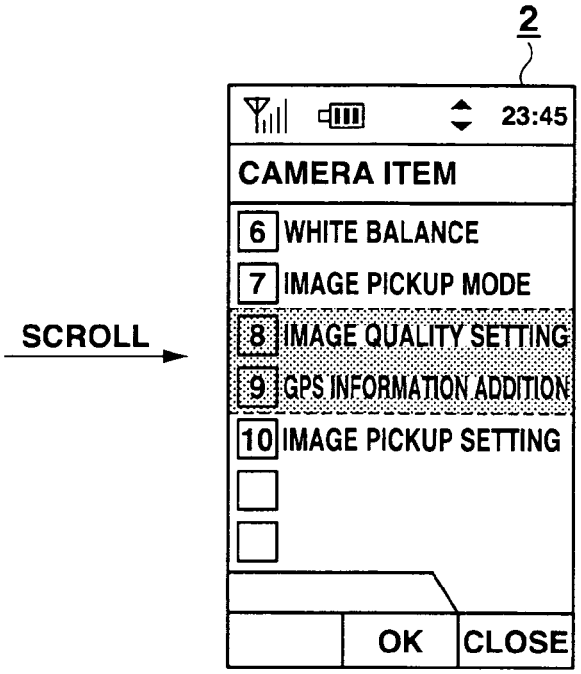

On the other hand, if selection of the image pickup item is instructed, the processing proceeds to step S53, a reference is made to such a camera control processing table shown in FIG. 24 in which selectable image pickup items are specified, and an image pickup item setting screen is displayed as shown in FIGS. 26A and 26B at step S54. In the image pickup item setting screen, there is first displayed a list of large items, e.g., a frame, an image pickup effect, macro setting, image pickup light setting, self-timer setting, white balance, a pickup mode, image quality setting, GPS information addition, photo setting as shown in FIGS. 26A and 26B. In the illustrated example, since all the setting items cannot be displayed in one screen, the list of setting items can be scrolled and displayed by a scrolling operation using the cruciform key 43 or the like. In the setting screen, items which cannot be selected when the camera mode is activated from the address book are displayed in gray. In the illustrated example, the image quality setting and the GPS information addition are displayed in gray.

Figure 26C:
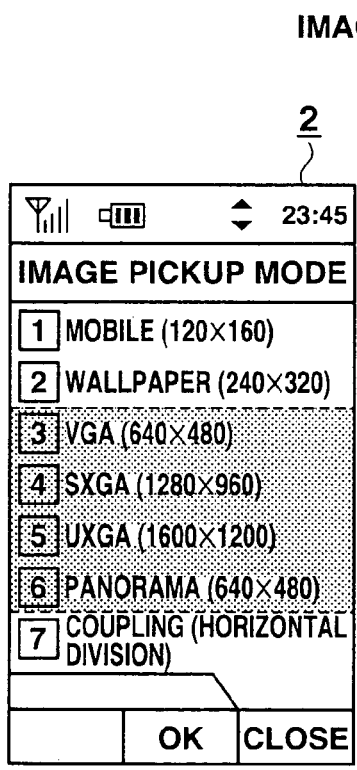

Furthermore, in the setting screen shown in FIGS. 26A and 26B, when any item is selected, a setting screen for small items which can be selected with that item is displayed. In the example shown in FIGS. 26A to 26C, there is illustrated a case that a pickup mode item is selected from the large item setting screen. When the pickup mode is selected, items which cannot be selected when the camera mode is activated from the address book are displayed in gray as shown in FIG. 26C, and a list of pickup sizes as small items is displayed. In this example, VGA (640×480), SXGA (1280×960), UXGA (1600×1200), panorama (1280×320) are displayed in gray because the camera mode is activated from the address book.

Then, at step S56, it is determined whether any image pickup item is selected. If any image pickup item is not selected, the processing returns to step S54, and display of the setting screen is continued. If any image pickup item is selected in the setting screen, it is determined at step S57 whether this item is an item which can be selected when the camera mode is activated from the address book. Here, when an item which cannot be selected, e.g., an item displayed in gray such as image quality or GPS information addition is selected, the processing returns to step S56, the item selection is continued, and the selection operation is ignored.

On the other hand, when a selectable item is selected, the set contents are set at step S58. For example, when an item "mobile (120×160)" is selected in the pickup mode, the pickup size is set to 120×160 dots. Likewise, when an item "wallpaper (240×320)" is selected, the pickup size is set to 240×320 dots. Then, at step S59, it is determined whether the setting is terminated, i.e., whether "close" is specified in the setting screen. If the setting is not terminated, the processing returns to step S54, and the processing to select the image pickup item is continued. On the other hand, when the setting is terminated, the processing advances to step S60.

At step S60, the imaging unit 71 is activated, and images monitored in the main display panel 2 are sequentially displayed. Subsequently, at step S61, it is determined whether a picked-up image is determined, i.e., whether the determination key 44 (shutter key) is pressed. If the determination key 44 is not pressed, the processing returns to step S60, and sequential display of the monitored images is continued.

On the other hand, when the determination key 44 is pressed and a picked-up image is determined, image data of this displayed image is subjected to compression encrypting processing in the image processing unit 18 and encrypted data is stored in the image memory 19 at step S62. Then, at step S63, the determined image stored in the image memory 19 is associated with the address book. For example, when a command to associate the determined image with an area in 001 Rei Tanaka's address book is issued by operating the determination key 44 by a user, the CPU 12 sets a link "1" for image display in 001 Rei Tanaka's address data area in the address book data storage area 172 shown in FIG. 7. Further, the CPU 12 stores the record number 001 of the image memory 10 storing the image data in the link information storage area 173 shown in FIG. 8 in accordance with 001 in the address book data storage area 172, and displays an image based on this image data in the editing screen in the main display panel 2 as shown in FIG. 6G. The CPU 12 returns to step S52 and continues the processing until it determines that the editing processing in the address book mode is terminated at step S64.

According to the fifth embodiment, in the mobile phone with a camera of mega pixels, since only the regular display size item of the mobile phone and the full-screen display size item of the mobile phone, i.e., only the item "mobile (120×160)" or "wallpaper (240×320)" which can be attached to the address book can be selected as the pickup sizes when the camera mode is activated from the address book, a user can take pictures without hesitating about the pickup sizes.

6. Sixth Embodiment

A sixth embodiment according to the present invention will now be described. In the sixth embodiment, all the pickup sizes (the regular display size items (120×160 dots) to UXGA (1600×1200 dots) of the mobile phone) are set selectable in the sub menu even if the camera mode is activated from the address book edition so as not to provide a user interface which gives a feeling of strangeness to a user when activating the camera mode from the address book editing. That is, even an image size which cannot be associated with the address book is not displayed in gray. Moreover, when a VGA size or a larger size is selected, only a thumbnail image (120×160 dots) generated based on the DCF standard (complying with the Exif standard) from a picked-up image is linked with the address book and reference can be made to original image data only when referring to a data folder.

FIG. 27 is a conceptual view showing a structure of an image file complying with the Exif standard which is used as an image file in the sixth embodiment. An image file based on the Exif standard is formed of a header used to identify this file as a file based on the Exif standard, image additional information comprised of tag information including various kinds of information concerning image data and thumbnail image data, and picked-up original image data. In the tag information can be recorded various kinds of information such as the number of pixels, a compression mode, a model name of the camera, an aperture value, a shutter speed, data and hour of image pickup, and user information. In the Exif standard, the thumbnail image data has a size of 120×160 dots. Additionally, the original image data can be saved in a pickup size set at the time of image pickup (mobile: 120×160, wallpaper: 240×320, VGA: 640×480, SXGA: 1280×960, UXGA: 1600×1200, panorama: 1280×320).

Figure 28:
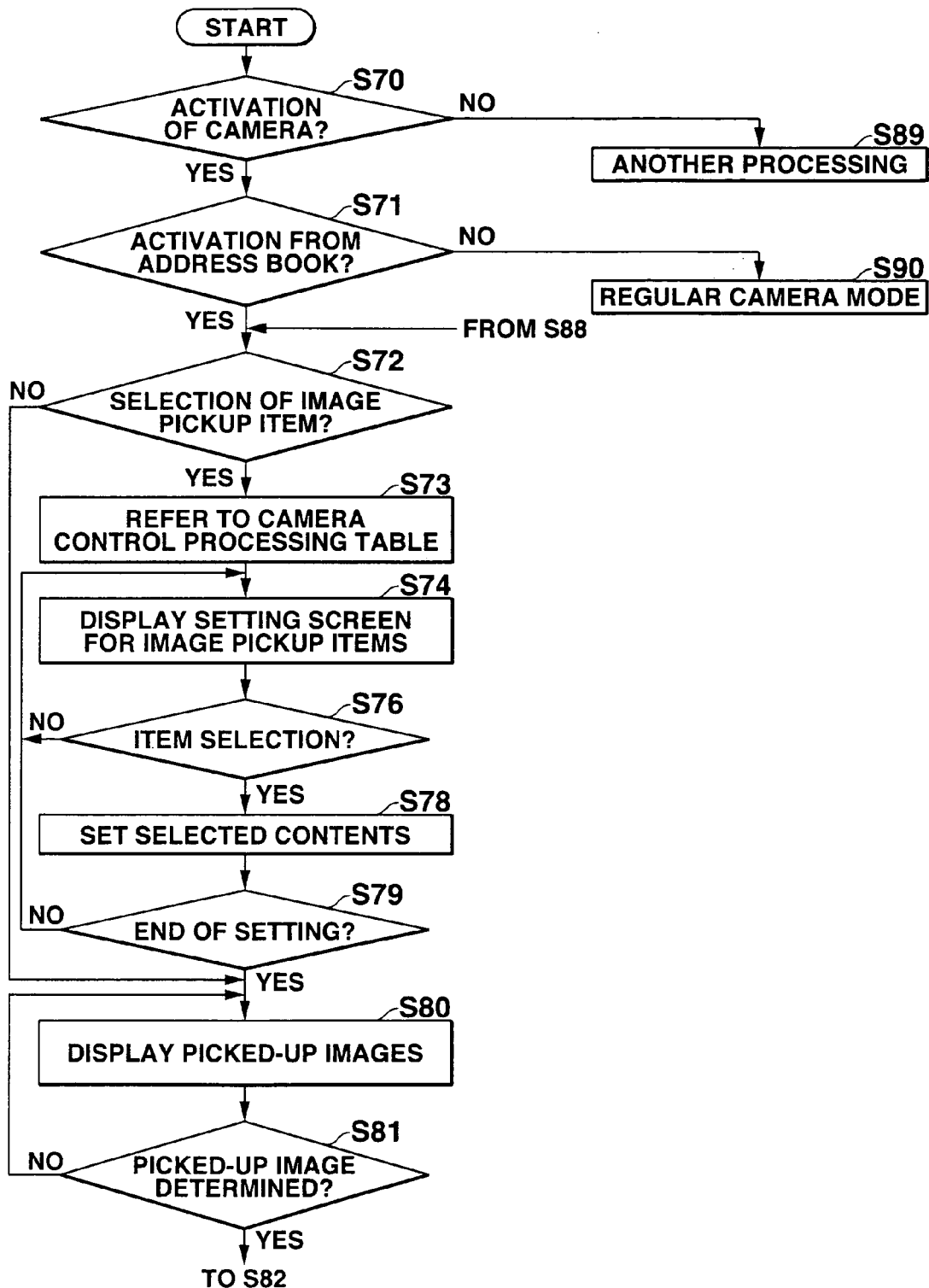
FIG. 28 is a flowchart illustrating an operation of the sixth embodiment.
Figure 29:
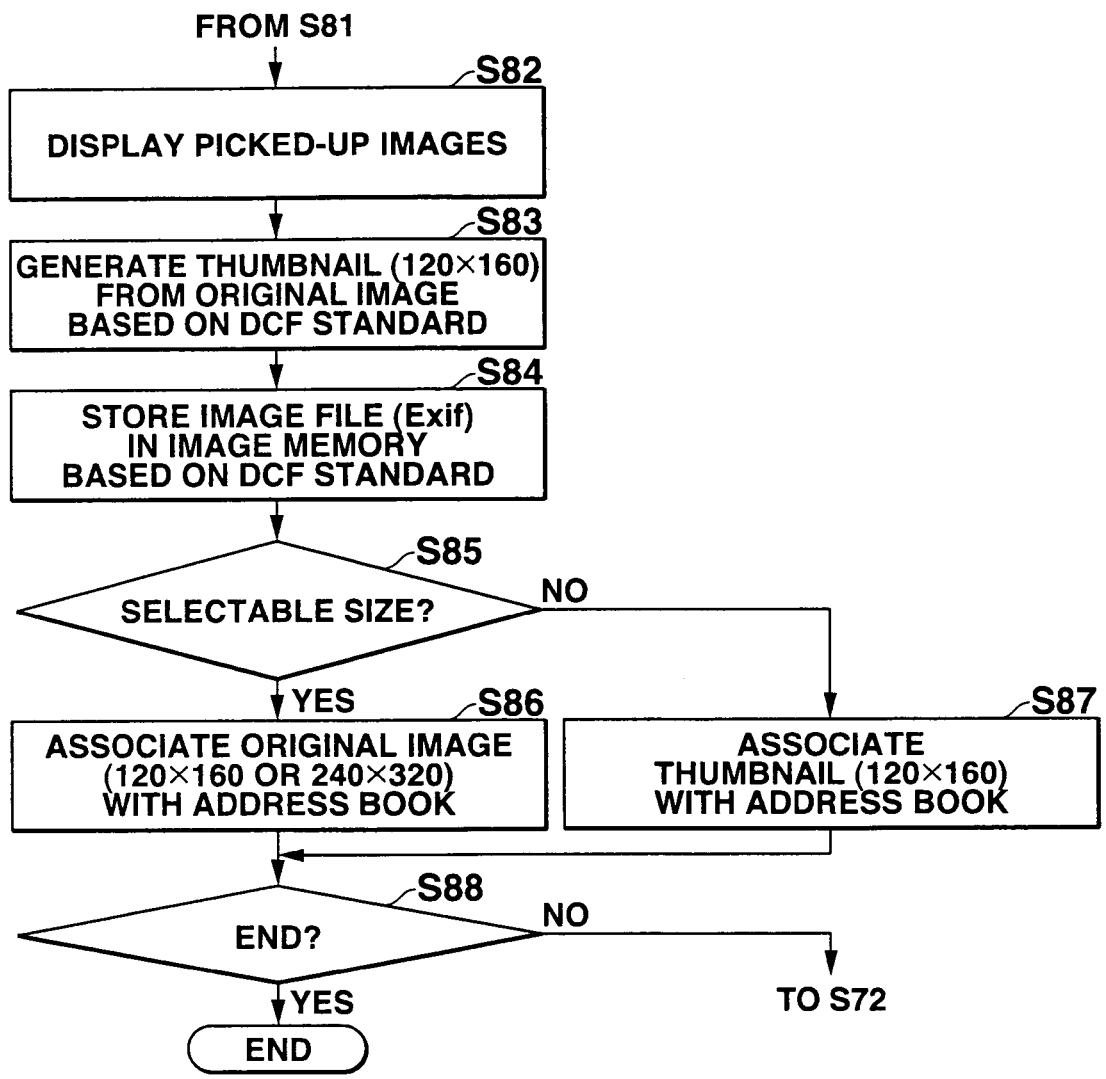
FIG. 29 is a flowchart illustrating the operation of the sixth embodiment.

A description will now be given as to an operation in the sixth embodiment. Here, FIGS. 28 and 29 are flowcharts illustrating the operation in the sixth embodiment. The CPU 12 determines whether the camera mode is activated at step S70. If the camera mode is not activated, the processing advances to another processing at step S89. On the other hand, if the camera mode is activated, the processing proceeds to step S71.

At step S71, it is determined whether the camera mode is activated from the address book. If the camera mode is not activated from the address book (if it is activated from, e.g., a waiting screen), the processing advances to step S90, and the regular camera mode is executed.

On the other hand, if the camera mode is activated from the address book, the processing proceeds to step S72, and it is determined whether selection of an image pickup item is specified. If selection of an image pickup item is not specified, the processing advances to a later-described step S80 in order to take pictures in a currently set pickup mode (pickup size or function).

On the other hand, if selection of the image pickup item is specified, the processing proceeds to step S73, an image pickup item setting screen is displayed as shown in FIGS. 26A and 26B at step S74 by making reference to a camera control processing table clearly showing selectable image pickup items. In the sixth embodiment, all items, i.e., large items such as a frame, an image pickup effect, macro setting, image pickup light setting, self-timer setting, white balance, pickup mode, image quality setting, GPS information addition or photo setting can be selected.

Further, when any item is selected in the setting screen for the large items, a setting screen for small items which can be set with that item is displayed. In this case, all the small items can be selected in the sixth embodiment. For example, when a pickup mode item is selected from the large item setting screen, items "mobile (120×160)," "wallpaper (240×320)," "VGA (640×480)," "SXGA (1280×960)," "UXGA (1600×1200)" and "panorama (1280×320)" are all displayed so as to be selectable.

Then, at step S76, it is determined whether any image pickup item is selected. When any image pickup item is not selected, the processing returns to step S74, and display of the setting screen is continued. On the other hand, when any image pickup item is selected in the setting screen, the set contents are set at step S78. For example, the item "mobile (120×160)" is selected in the pickup mode, the pickup size is set to 120×160 dots. Likewise, when the item "VGA (640×480)" is selected, the pickup size is set to 640×480 dots. Then, at step S79, it is determined whether the setting is terminated, i.e., whether "close" is specified in the setting screen. If the setting is not terminated, the processing returns to step S74, and the processing to select an image pickup item is continued. On the other hand, if the setting is terminated, the processing advances to step S80.

At step S80, the imaging unit 71 is activated, and images monitored in the main display panel 2 are sequentially displayed. Then, it is determined whether a picked-up image is determined, i.e., whether the determination key 44 (shutter key) is pressed. If the determination key 44 is not pressed, the processing returns to step S80, and sequential display of the monitored images is continued.

On the other hand, when the determination key 44 is pressed and a picked-up image is determined, image data of this displayed image is subjected to compression encrypting processing in the image processing unit 18 and encrypted data is temporarily stored in the image memory 19 at step S82. Then, a thumbnail (120×160) is generated based on the DCF standard at step S83, an image file based on the Exif standard formed of a header used to identify a file based on the Exif standard, image addition information comprised of tag information including various information concerning image data and thumbnail image data, and picked-up original image data is generated based on the DCF standard and stored in the image memory 19 at step S84.

Subsequently, the CPU 12 determines whether an image size of the picked-up original image data is a selectable size, i.e., a size which can be linked with the address book (mobile: 120×160 dots, or wall paper: 240×0.320 dots) at step S85. Then, if the image size of the original image data is a size which can be linked with the address book, the original image data constituted of 120×160 dots or 240×320 dots is associated with the address book at step S86. Association with the address book is the same as that in the fifth embodiment, thereby eliminating its explanation.

On the other hand, if the image size of the original data is a size which cannot be linked with the address book, i.e., if the image size is one of VGA (640×480), SXGA (1280× 960), UXGA (1600×1200) and panorama (1280×320), the thumbnail (120×160) generated at step S83 is associated with the address book. Association with the address book is the same as that in the fifth embodiment, thereby eliminating its explanation.

Further, in any case, the CPU 12 returns to step S72 and continues processing until it determines that the editing processing in the address book mode is terminated at step S88.

Here, a description will be given as to the association (link) of the thumbnail image with the address book. As a first link method to associate the thumbnail image with the address book, a thumbnail image created based on the DCF standard is copied, and that copy is formed as another file and linked with a record which is currently edited in the address book. In this case, there is an advantage that the image file is not affected even if decorative processing or the like is performed during the address book editing. Furthermore, when applying another decorative processing and storing a result, copying a thumbnail image in the already stored image file can suffice, thereby advantageously saving trouble to perform image pickup twice.

Moreover, as a second link method, a storage start address of a thumbnail image in an image file created based on the DCF standard is linked. In this case, there is an advantage that the number of image files is not unnecessarily increased. As to adoption of either link method, the method may be appropriately selected at the time of designing, or means for realizing the both link methods may be included and a user may be caused to set a use of one of these methods.

According to the sixth embodiment, in the mobile phone with a camera of mega pixels, image data having an image size (thumbnail image) which can be associated with the address book can be automatically associated without giving a feeling of strangeness to a user when the camera mode is activated from the address book editing even if an arbitrary pickup size is selected and image pickup is effected.

It is to be noted that the operation of each of the foregoing embodiments can be carried out by programming this operation and causing a computer to execute the obtained program. At that time, a computer program can be supplied to a computer through a disk type recording medium such as a floppy disk or a hard disk, various kinds of memories such as a semiconductor memory or a card type memory, or various kinds of program recording mediums such as a communication network.

Additionally, the present invention is not restricted to the foregoing embodiments, and it can be likewise carried out by any other various conformations in specific structures, functions, effects and advantages without departing from the scope of the invention. Further, the same advantages can be obtained when the present invention is applied to various kinds of mobile computer terminals such as a PDA or a portable personal computer having an image pickup function.

What is claimed is:

1. An imaging apparatus with a communication function, comprising:
   a communication unit;
   an image pickup unit which is capable of picking up image data of various sizes;
   an address book memory which stores address data for use in communication by the communication unit, and which stores image data picked up by the image pickup unit in association with the address data;
   a mode setting unit which sets one of a creation mode to create address data to be stored in the address book memory, and an editing mode to edit the address data stored in the address book memory; and
   a size setting unit which sets a size of image data to be picked up by the image pickup unit;
   wherein when the image pickup unit is activated when one of the creating mode and the editing mode is set, the setting unit prohibits setting at least one of the various sizes of image data that the image pickup unit is capable of picking up, and the prohibited at least one size comprises any size that exceeds a predetermined size.

2. The imaging apparatus according to claim 1, further comprising:
   a display unit; and
   a resolution setting unit which sets different display resolutions for image data that is directly displayed after being picked up by the image pickup unit and for image data that is displayed after being read out from the address book memory.

3. The imaging apparatus according to claim 2, wherein the image pickup unit is operable to continuously pick up image data comprising a plurality of frames, wherein the address book memory stores at least a plurality of the picked up frames of image data in association with the address data, and wherein the imaging apparatus further comprises:
   a selector which selects image data for display by the display unit in association with the address data from the plurality of frames of image data stored in the address book memory.

4. The imaging apparatus according to claim 1, further comprising an image recognizing unit which recoqnizes a person portion from the image data picked up by the image pickup unit, and
   wherein the address book memory stores the person portion recognized by the image recognizing unit in association with the address data.

5. The imaging apparatus according to claim 4, further comprising an image processing unit which processes a background portion other than the person portion recognized by the image recognizing unit, and wherein the address book memory stores the image data having the background portion processed by the image processing unit in association with the address data.

6. The imaging apparatus according to claim 1, further comprising:
an incoming call notifying unit; and
a notification setting unit which sets a notification method of the incoming call notifying unit based on the image data stored in the address book memory in association with the address data.

7. An imaging apparatus having a communication function, comprising:
a communication unit;
an image pickup unit which is capable of picking up image data of various sizes;
an address book memory which stores address data to be used in communication by the communication unit, and which stores image data picked up by the image pickup unit in association with the address data;
a mode setting unit which sets one of a creation mode to create address data to be stored in the address book memory, and an editing mode to edit the address data stored in the address book memory; and
a size setting unit which sets a size of image data picked up by the image pickup unit; and
a reduced image creation unit which creates reduced image data of the image data picked up by the image pickup unit;
wherein the address book memory stores the reduced image data created by the reduced image creation unit when the image pickup unit is activated when one of the creating mode and the editing mode is set and when the size of the image data set by the size setting unit is equal to or greater than a predetermined size.

8. An image data storing method for an electronic device including a communication unit, and an image pickup unit which is capable of picking up image data of various sizes, the method comprising:
setting one of a creation mode to create address data to be stored in an address book memory, and an editing mode to edit the address data stored in the address book storing memory, wherein said address book memory stores the address data, which is to be used in communication by the communication unit, and stores image data picked up by the image pickup unit in association with the address data;
setting one of the various sizes of image data to be picked up by the image pickup unit;
activating the image pickup unit to pick up image data; and
when the image pickup unit is activated when one of the creating mode and the editing mode is set, prohibiting setting of at least one of the various sizes of image data that the image pickup unit is capable of picking up;
wherein the prohibited at least one size comprises any size that exceeds a predetermined size.

9. The method according to claim 8, further comprising setting different display resolutions of a display panel for image data that is directly displayed after being picked up and for image data that is displayed after being read out from the address book memory.

10. The method according to claim 9,
wherein the image pickup unit is operable to continuously pick up image data comprising a plurality of frames, wherein the address book memory stores at least a plurality of the picked up frames of image data in association with the address data, and wherein the method further comprises:
selecting image data to be displayed in association with the address data from the plurality of stored frames of image data.

11. The method according to claim 8, further comprising recognizing a person portion of the picked up image data; and
storing in the address book memory the recognized person portion in association with the address data.

12. The method according to claim 8, further comprising setting a notification method of an incoming call based on the image data stored in the address book memory in association with the address data.

13. An image data storing method for an electronic device including a communication unit, and an image pickup unit which is capable of picking up image data of various sizes, the method comprising:
setting one of a creation mode to create address data to be stored in an address book memory and an editing mode to edit the address data stored in the address book storing memory, wherein said address book memory stores the address data, which is to be used in communication by the communication unit, and stores image data picked up by the image pickup unit in association with the address data;
setting one of the various sizes of image data to be picked up by the image pickup unit;
activating the image pickup unit to pick up image data;
creating reduced image data of the image data picked up by the image pickup unit;
wherein the address book memory stores the reduced image of data when the image pickup unit is activated when one of the creating mode and the editing mode is set and when the set size of the image data is equal to or greater than a predetermined size.

14. A computer-readable recording medium having a program stored thereon which is executable by a computer that controls an electronic device including a communication unit, an image pickup unit which is capable of picking up image data of various sizes, and a display panel, so as to cause the computer to execute:
setting one of a creation mode to create address data to be stored in an address book memory, and an editing mode to edit the address data stored in the address book memory, wherein said address book memory stores the address data, which is to be used in communication by the communication unit, and stores image data picked up by the image pickup unit in association with the address data;
setting one of the various sizes of image data to be picked up by the image pickup unit;
activating the image pickup unit to pick up image data;
when the image pickup unit is activated when one of the creating mode and the editing mode is set, prohibiting setting of at least one of the various sizes of image data that the image pickup unit is capable of picking up, wherein said prohibited at least one size comprises any size that exceeds a predetermined size; and
setting different display resolutions of a display panel for image data that is directly displayed afer being picked up and for image data that is displayed after being read out from the address book memory.

* * * * *